United States Patent
Nakamura et al.

(10) Patent No.: US 11,740,937 B2
(45) Date of Patent: *Aug. 29, 2023

(54) PARALLEL PROCESS APPARATUS, PARALLEL PROCESS SYSTEM, AND PARALLEL PROCESSING METHOD FOR PARALLELIZING MULTIPLE PROCESSES IN ACCORDANCE WITH MULTIPLE PROCESS REQUESTS

(71) Applicant: DENSO CORPORATION, Kariya (JP)

(72) Inventors: Sho Nakamura, Kariya (JP); Yuzo Harata, Kariya (JP); Kazuaki Hayakawa, Kariya (JP); Tatsuya Sato, Kariya (JP); Yasuo Morita, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/705,438

(22) Filed: Mar. 28, 2022

(65) Prior Publication Data
US 2022/0214914 A1    Jul. 7, 2022

Related U.S. Application Data

(63) Continuation of application No. 16/407,933, filed on May 9, 2019, now Pat. No. 11,314,549, which is a
(Continued)

(30) Foreign Application Priority Data

May 25, 2017 (JP) .................... 2017-103606

(51) Int. Cl.
*G06F 9/48* (2006.01)
*B60R 16/023* (2006.01)
(Continued)

(52) U.S. Cl.
CPC .......... *G06F 9/4881* (2013.01); *B60R 16/023* (2013.01); *G06F 9/52* (2013.01); *G06F 13/4204* (2013.01); *H04L 67/12* (2013.01)

(58) Field of Classification Search
None
See application file for complete search history.

(56) References Cited

U.S. PATENT DOCUMENTS 5,278,975 A * 1/1994 Ishihata .................. G06F 9/52
                                                              713/375
6,694,235 B2    2/2004 Akiyama
(Continued)

FOREIGN PATENT DOCUMENTS

JP    2002300165 A    10/2002
JP    2003019931 A     1/2003
(Continued)

OTHER PUBLICATIONS

U.S. Appl. No. 16/407,933, filed May 9, 2019, Sho Nakamura.
(Continued)

*Primary Examiner* — Van H Nguyen
(74) *Attorney, Agent, or Firm* — Harness, Dickey & Pierce, P.L.C.

(57) ABSTRACT

A parallel process apparatus connecting electronic controllers via buses includes: a process request acceptance section that accepts process requests to the electronic controllers; and a process execution section that, while multiple process requests are simultaneously accepted, arbitrates the multiple process requests being accepted, and parallelizes multiple processes in accordance with the multiple process requests.

3 Claims, 27 Drawing Sheets

Related U.S. Application Data continuation of application No. PCT/JP2017/031399, filed on Aug. 31, 2017.

(51) Int. Cl.
  *G06F 9/52*  (2006.01)
  *G06F 13/42*  (2006.01)
  *H04L 67/12*  (2022.01)

(56) References Cited

U.S. PATENT DOCUMENTS

| | | | |
|---|---|---|---|
| 8,448,172 B2 * | 5/2013 | Tamiya | G06F 9/4881 703/22 |
| 9,164,696 B2 | 10/2015 | Abe et al. | |
| 9,224,251 B2 | 12/2015 | Harata et al. | |
| 10,095,556 B2 * | 10/2018 | Prasad | G06F 9/522 |
| 10,453,106 B2 * | 10/2019 | Sandstrom | G06F 9/5011 |
| 10,528,388 B1 * | 1/2020 | Chang | G06F 9/4881 |
| 10,552,143 B2 | 2/2020 | Nakano | |
| 2003/0009271 A1 | 1/2003 | Akiyama | |
| 2015/0254909 A1 | 9/2015 | Harata et al. | |
| 2015/0281022 A1 | 10/2015 | Harata et al. | |
| 2016/0366646 A1 | 12/2016 | Yun et al. | |
| 2019/0235855 A1 | 8/2019 | Nakano | |

FOREIGN PATENT DOCUMENTS

| | | |
|---|---|---|
| JP | 2003046536 A | 2/2003 |
| JP | 2006287738 A | 10/2006 |
| JP | 2010-271891 A | 12/2010 |
| JP | 2011-238154 A | 11/2011 |
| JP | 2012160839 A | 8/2012 |
| WO | WO-2014057642 A1 | 4/2014 |
| WO | WO-2014057643 A1 | 4/2014 |

OTHER PUBLICATIONS

Lee et al. "A Parallel Re-programming Method for In-vehicle Gateway to save software update time", 2015 IEEE, pp. 1497-1502.
Kim et al. "Gateway Framework for In-Vehicle Networks Based on CAN, FlexRay, and Ethernet", 2014 IEEE, pp. 4472-4486.
Hegde et al. "Load Balancing Towards ECU Integration", 2009 IEEE, pp. 521-524.

* cited by examiner

PARALLEL PROCESS APPARATUS, PARALLEL PROCESS SYSTEM, AND PARALLEL PROCESSING METHOD FOR PARALLELIZING MULTIPLE PROCESSES IN ACCORDANCE WITH MULTIPLE PROCESS REQUESTS

CROSS REFERENCE TO RELATED APPLICATIONS

The present application is a continuation of U.S. patent application Ser. No. 16/407,933 filed on May 9, 2019 (now U.S. Pat. No. 11,314,549) which is a continuation application of International Patent Application No. PCT/JP2017/031399 filed on Aug. 31, 2017, which designated the U.S. and claims the benefit of priority from Japanese Patent Application No. 2016-228959 filed on Nov. 25, 2016 and Japanese Patent Application No. 2017-103606 filed on May 25, 2017. The entire disclosures of the above applications are incorporated herein by reference.

TECHNICAL FIELD

The present disclosure relates to a parallel process apparatus and a parallel process program.

BACKGROUND ART

A process apparatus is connected with an electronic control unit (hereinafter, referred to as an ECU) and accepts process requests of various independent applications such as a reprograming application, a malfunction diagnosis application, or a key management application for the ECU.

SUMMARY

The present disclosure provides a parallel process apparatus that may connect electronic controllers via buses. The parallel process apparatus may parallelize multiple processes in accordance with multiple process requests, while simultaneously accepting the multiple process requests.

Further, the present disclosure provides a computer-readable non-transitory storage medium storing a parallel process program that may cause a parallel process apparatus to parallelize multiple processes in accordance with multiple process requests, while simultaneously accepting the multiple process requests.

BRIEF DESCRIPTION OF DRAWINGS

The above and other objects, features and advantages of the present disclosure will become more apparent from the following detailed description taken in conjunction with the accompanying drawings. In the drawings.

DETAILED DESCRIPTION

Figure 1:
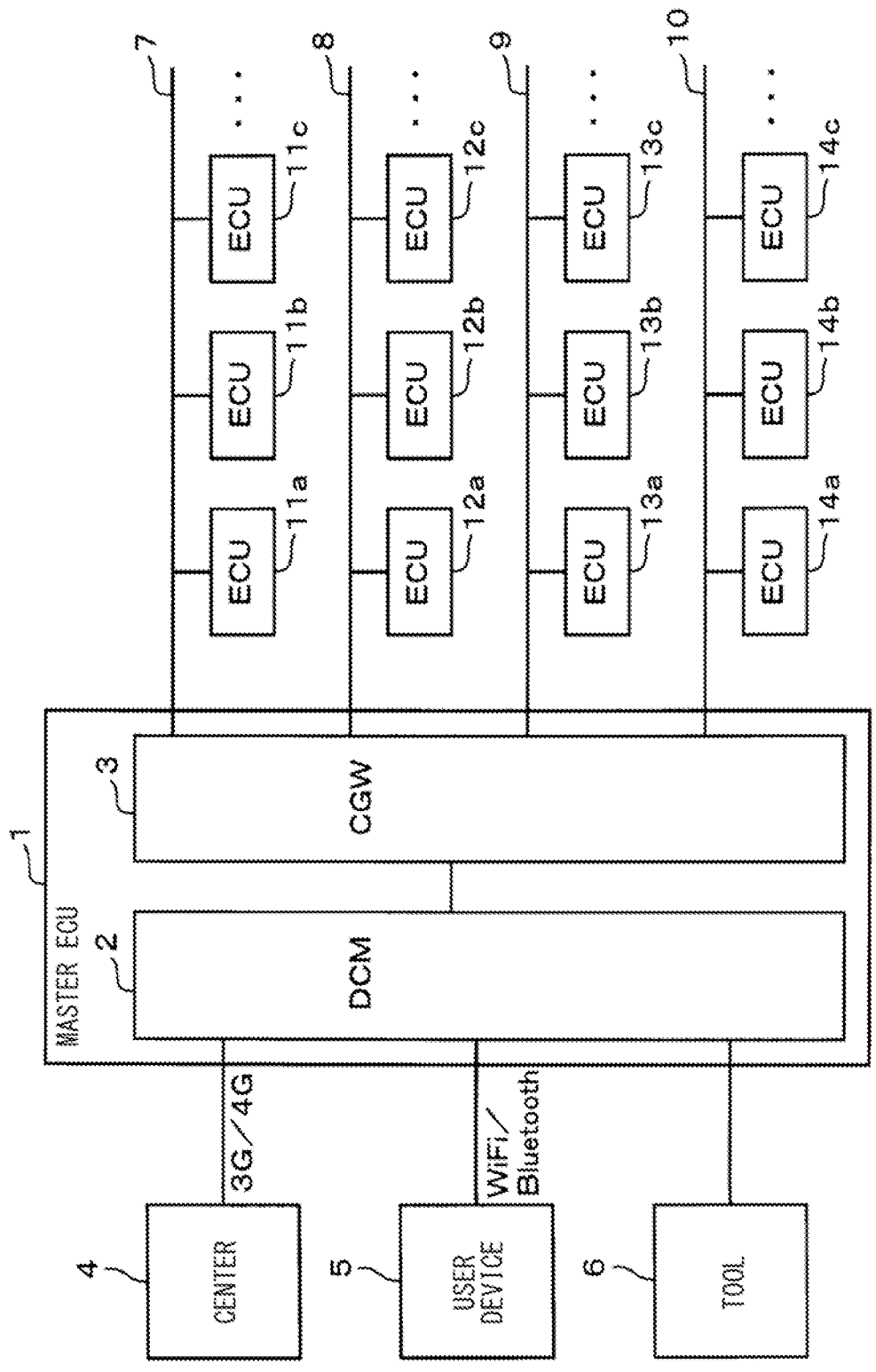
FIG. 1 is a diagram showing an entire system configuration according to a first embodiment.

A process apparatus is connected with an electronic control unit (hereinafter, referred to as an ECU) and accepts process requests of various independent applications such as a reprograming application, a malfunction diagnosis application, or a key management application for the ECU.

This kind of the process apparatus accepts a process request to an ECU, and executes a process according to the accepted process request. In this case, the process apparatus executes one-to-one communication with the ECU corresponding to a request destination of the process request in order. The process apparatus executes the process according to the accepted order of the process request. That is, the process apparatus accepts a first process request to ECU, and starts a first process in accordance with the accepted first process request. Before completing the first process, that is, after accepting a second process request to the ECU having executed the first process, the process apparatus waits to start a second process in accordance with the accepted second process request. The process apparatus completes the first process, and starts the waited second process.

On the other hand, a program capacity of ECU increases, and a system is complicated or the like due to a complication of a control. Thereby, a necessity for executing multiple processes by multitasking increases. In the described above configuration that waits to start the second process until completion of the first process, it may be difficult to execute the multiple processes by multitasking.

Hereinafter, an embodiment applied to a parallel process apparatus mounted on a vehicle is described with reference to the drawings.

A master electronic control unit (hereinafter, referred to as master ECU) 1 includes a data communication module (hereinafter, referred to as a DCM) 2, and a central gateway (hereinafter, referred to as a CGW) 3. The CGW 3 corresponds to the parallel process apparatus.

The DCM 2 controls data communication with a center 4, a user device 5, and a tool 6 via a vehicle outside network. That is, the DCM 2 controls data communication with the center 4 via a mobile communication network by a 3G network, a 4G network, or the like, for example. The DCM 2 controls data communication with the user device 5 via, for example, WiFi (registered trademark) or Bluetooth (registered trademark). The DCM 2 controls data communication with the tool 6 by, for example, wired connection. Upon receiving an application from the center 4, the user device 5, the tool 6 or the like, the DCM 2 transmits the received application to the CGW 3. For example, the DCM 2 receives a reprograming application from the tool 6 when a user operates the tool 6 to activate the reprograming application. The DCM 2 transmits the received reprograming application to the CGW 3. For example, the DCM 2 receives a diagnosis application from the tool 6 when the user operates the tool 6 to activate the diagnosis application. The DCM 2 transmits the received diagnosis application to the CGW 3.

Upon receiving the application from the DCM 2, the CGW 3 accepts a process request of the application. For example, upon receiving the reprograming application from the DCM 2, the CGW 3 accepts a process request of the reprograming application. For example, upon receiving the diagnosis application from the DCM 2, the CGW 3 accepts a process request of the diagnosis application.

The CGW 3 is connected with multiple buses 7 to 10 and controls the data communication with the ECU mounted on the vehicle via the buses 7 to 10. The buses 7 to 10 correspond to, for example, a multimedia type bus, a powertrain type bus, an environment type bus, a chassis type bus, or the like. The buses 7 to 10 correspond to CAN (controller area network, registered trademark), LIN (local interconnect network, registered trademark), CXPI (clock extension peripheral interface, registered trademark), FlexRay (registered trademark), MOST (media oriented systems transport, registered trademark), or the like. Communication protocol is different from each other. Communication speed or signal format is different from each other.

The buses 7 to 10 are connected with each of ECUs 11a to 11c, 12a to 12c, 13a to 13c, and 14a to 14c. For example, the multimedia type bus is connected with a navigation ECU that controls navigation, an ETCECU that performs communication control with an electronic toll collection system (ETC: registered trademark), or the like. For example, the powertrain type bus is connected with an engine ECU for controlling the engine, a brake ECU for controlling a brake, an ECTECU for controlling an automatic transmission, a power steering ECU for controlling a power steering, or the like. For example, the body type bus is connected with a door ECU for controlling a locking/unlocking of a door, a meter ECU for controlling a display of a meter, an air conditioning ECU for controlling an air conditioner, a window ECU for controlling an opening and closing of a window, or the like.

Figure 2:
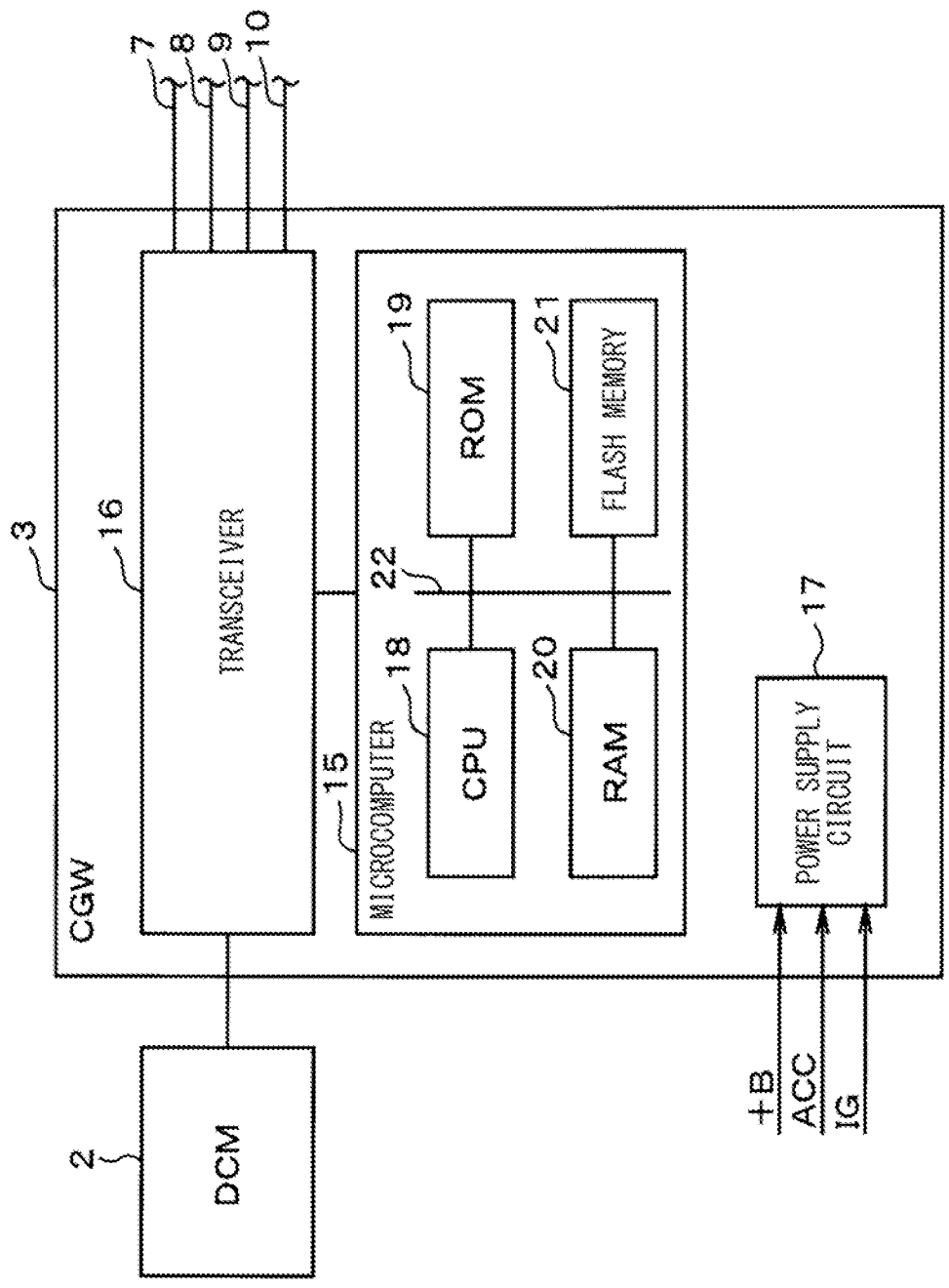
FIG. 2 is a functional block diagram showing a configuration of a central gateway.

As shown in FIG. 2, the CGW 3 includes a microcomputer 15, a transceiver 16, and a power supply circuit 17. In the microcomputer 15, a CPU 18, a ROM 19 as a non-transitory tangible storage medium, a RAM 20, and a flash memory 21 are mutually connected via an internal bus 22. In the microcomputer 15, the CPU 18 executes a control program stored in the ROM 19 to control operation of the CGW 3. The transceiver 16 controls the data communication with the ECUs 11a to 11c, 12a to 12c, 13a to 13c, and 14a to 14c via the buses 7 to 10 while controlling the data communication with the DCM 2, according to a command from the microcomputer 15. The power supply circuit 17 inputs an accessory signal indicating ON/OFF of an accessory switch and an ignition signal indicating ON/OFF of an ignition switch. For example, upon on detecting switching from ON to OFF of the accessory signal, the power supply circuit 17 generates operation power based on power supplied from a battery power supply. The power supply circuit 17 supplies the generated operation power to the microcomputer 15 and the transceiver 16.

Figure 3:
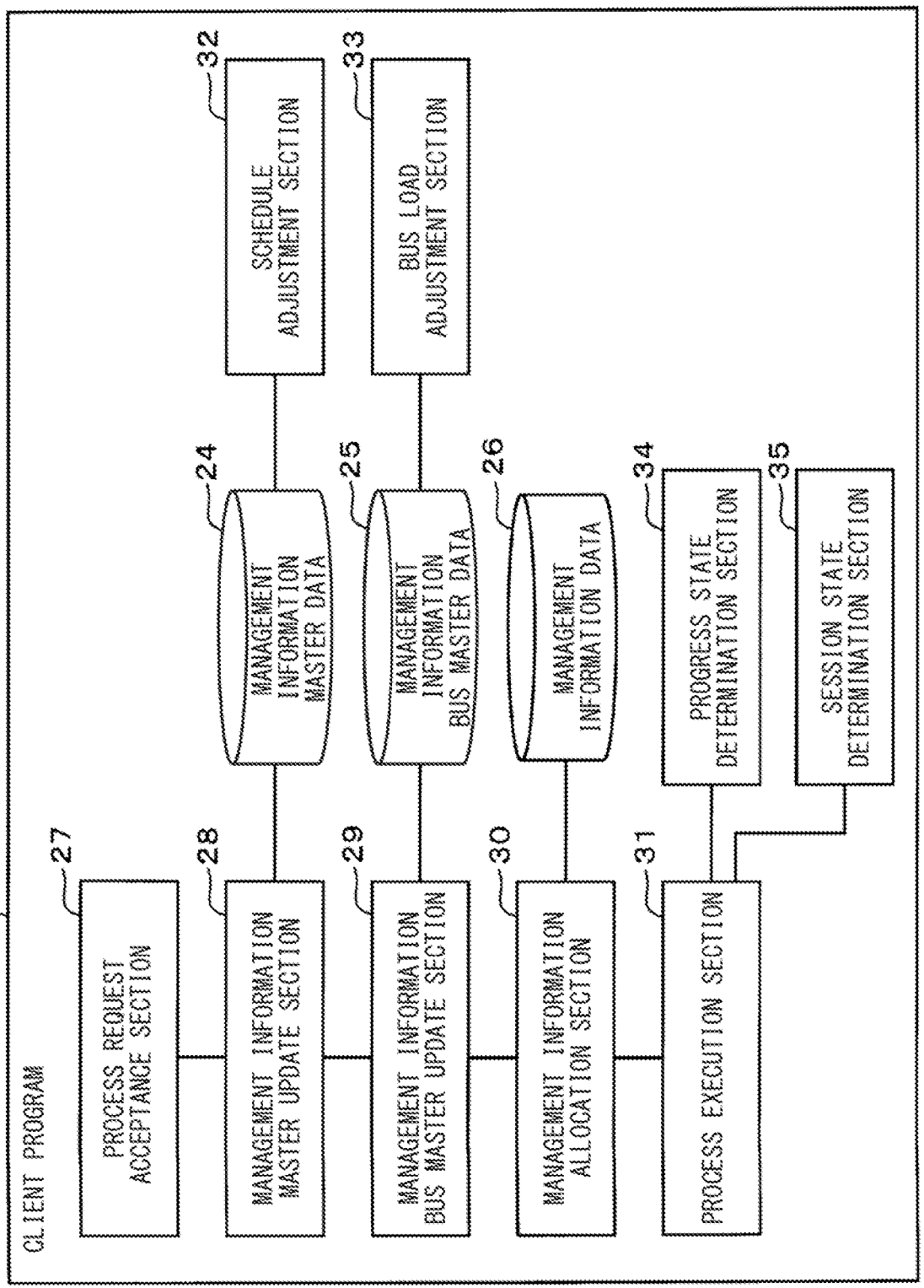
FIG. 3 is a diagram showing a configuration of a client program.
Figure 4:
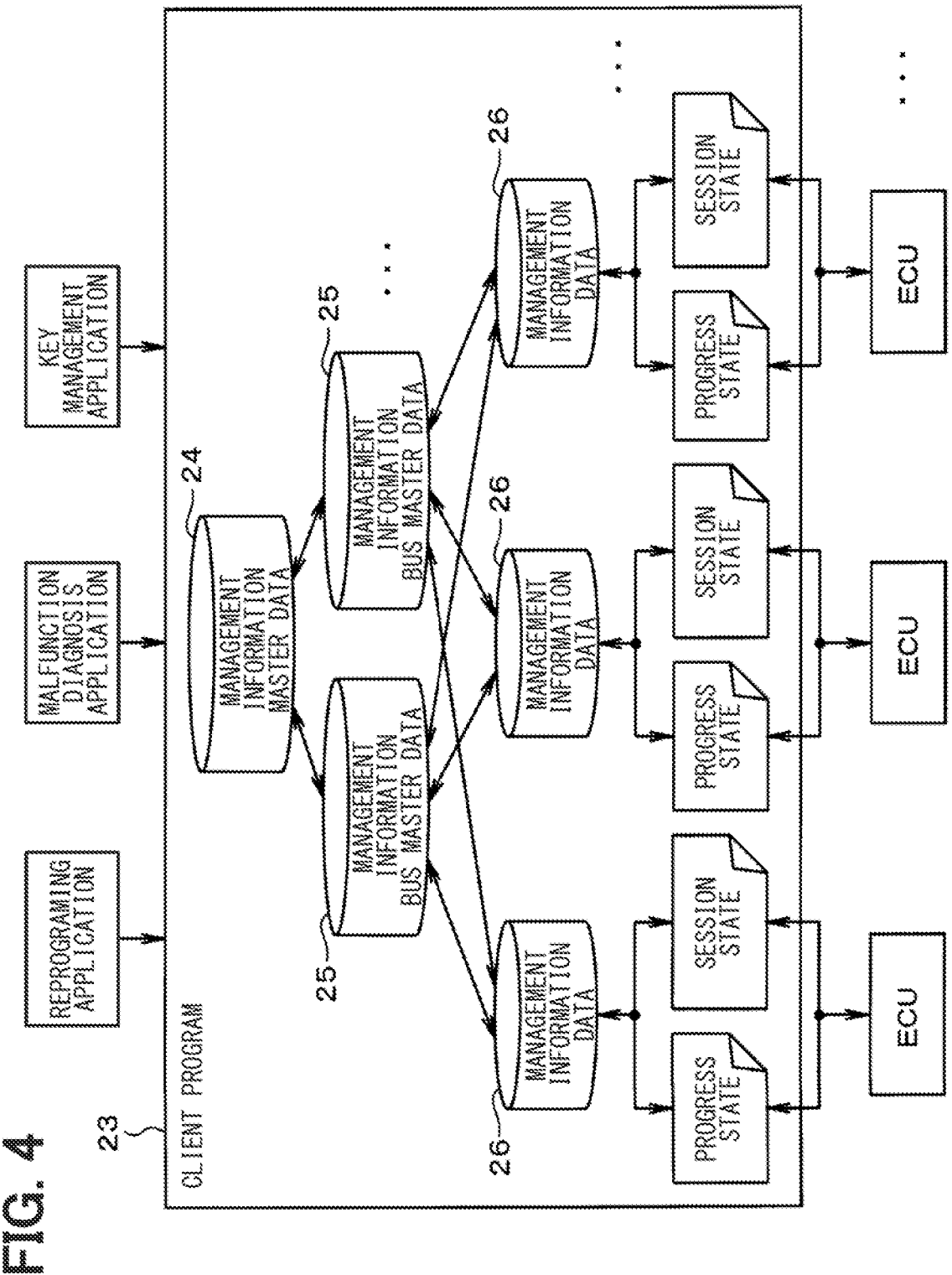
FIG. 4 is a diagram showing a hierarchy of data.

The ROM 19 stores a client program as one control program. A client program 23 includes a parallel process program. As shown in FIG. 3, the client program 23 includes, as function for storing each kind of data, a management information master data storage 24 that stores management information master data, a management information bus master data storage 25 that stores management information bus master data, and a management information data storage 26 that stores management information data. The management information master data storage 24 stores data regarding to the communication speeds of the buses 7 to 10, data regarding to adjustment of a schedule, or the like as the management information master data. The management information bus master data storage 25 stores data regarding to the ECUs 11a to 11c, 12a to 12c, 13a to 13c, and 14a to 14c to which the management information data has already been allocated, data regarding to adjustment of bus load, or the like as the management information bus master data. The management information data storage 26 stores data regarding to a priority of the process request being accepted, data regarding to states of the buses 7 to 10, data regarding to states of the ECUs 11 a to 11c, 12a to 12c, 13a to 13c, and 14a to 14c, data regarding to a progress state of the process, data regarding to a session state of the process, or the like as the management information data. As shown in FIG. 4, the client program 23 hierarchically manages these management information master data, management information bus master data, and management information data.

The client program 23 includes a process request acceptance section 27, a management information master update section 28, a management information bus master update section 29, a management information allocation section 30, a process execution section 31, a schedule adjustment section 32, a bus load adjustment section 33, a progress state determination section 34, and a session state determination section 35.

The process request acceptance section 27 accepts the process request of the application to the ECUs 11a to 11c, 12a to 12c, 13a to 13c, and 14a to 14c, the application being independent. The application of which process request is accepted by the process request acceptance section 27 corresponds to, for example, the reprograming application, the malfunction diagnosis application, the key management application, or the like. The management information master update section 28 and the management information bus master update section 29 monitor states of the buses 7 to 10 or states of the ECUs 11a to 11c, 12a to 12c, 13a to 13c, and 14a to 14c, the states respectively changing according to execution of the process by the process execution section 31. The management information master update section 28 and the management information bus master update section 29 update the management information master data and the management information bus master data according to the change of the state. The management information allocation section 30 refers to the management information master data and the management information bus master data, and allocates the management information data to the process request.

The process execution section 31 refers to the management information master data, the management information bus master data, and the management information data to arbitrate the process requests of the multiple applications. That is, while accepting the process request of one application, the process execution section 31 accepts the process request of another application, and the process execution section 31 determines the priority between the process request of the one application and the process request of another application, states of the buses 7 to 10, states of the ECUs 11a to 11c, 12a to 12c, 13a to 13c, and 14a to 14c at the accepting time, or the like. The process execution section 31 arbitrates the process request of the one application and the process request of another application. The process execution section 31 arbitrates so that priority is given to the process in accordance with the process request of the one application, for example, when the priority of the process request of the one application is higher than the priority of the process request of another application. By contrast, the process execution section 31 arbitrates so that the priority is given to the process in accordance with the process request of another application, for example, when the priority of the process request of another application is higher than the priority of the process request of the one application. The process execution section 31 executes the process when the load of the bus or the load of the ECU corresponding to the destination of the process request is comparatively low. The process execution section 31 arbitrates so as to wait the execution of the process, when the load of the bus or the load of the ECU corresponding to the destination of the process request is comparatively high.

The schedule adjustment section 32 uses data regarding to adjustment of the schedule, the data being stored in the management information master data storage 24, and adjusts a schedule. The schedule adjustment section 32 adjusts, for example, a signal transmission interval as the adjustment of the schedule. The bus load adjustment section 33 uses data regarding to adjustment of the bus load, the data being stored in the management information bus master data storage 25, and adjusts a bus load. The bus load adjustment section 33 adjusts data communication amount of the bus as the adjustment of the bus load. The progress state determination section 34 uses data regarding to the progress state, the data being stored in the management information data storage 26, and determines a progress state of the process. The session state determination section 35 uses data regarding to the session state, the data being stored in the management information data storage 26, and determines a session state of the process.

The process execution section 31 arbitrates the process requests of the multiple applications. According to the section adjusted by the schedule adjustment section 32 and the bus load adjusted by the bus load adjustment section 33, the process execution section 31 parallelizes the multiple processes while monitoring the progress state determined by the progress state determination section 34 and the session state determined by the session state determination section 35.

Figure 5:
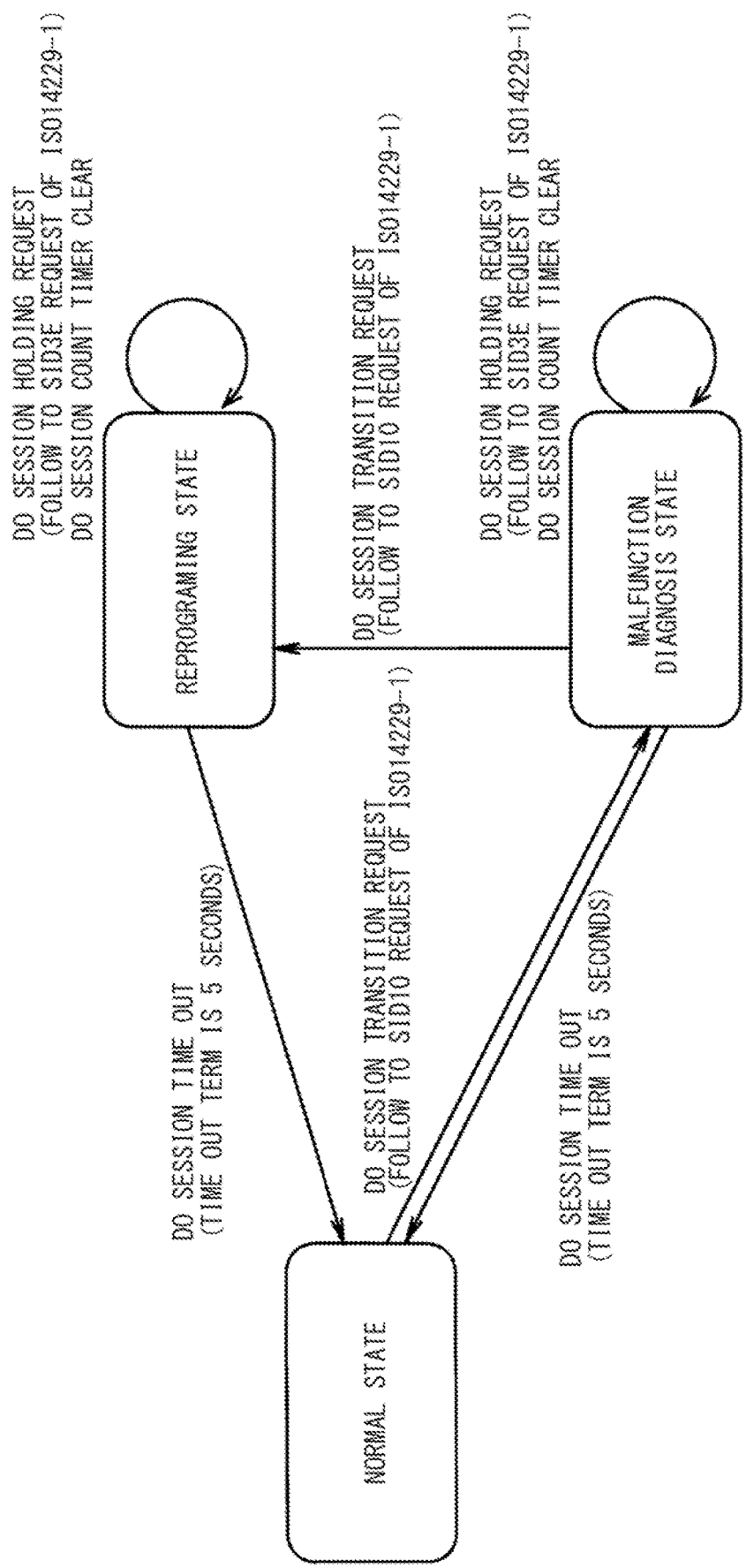
FIG. 5 is a diagram showing a transition of a session state.
Figure 6:
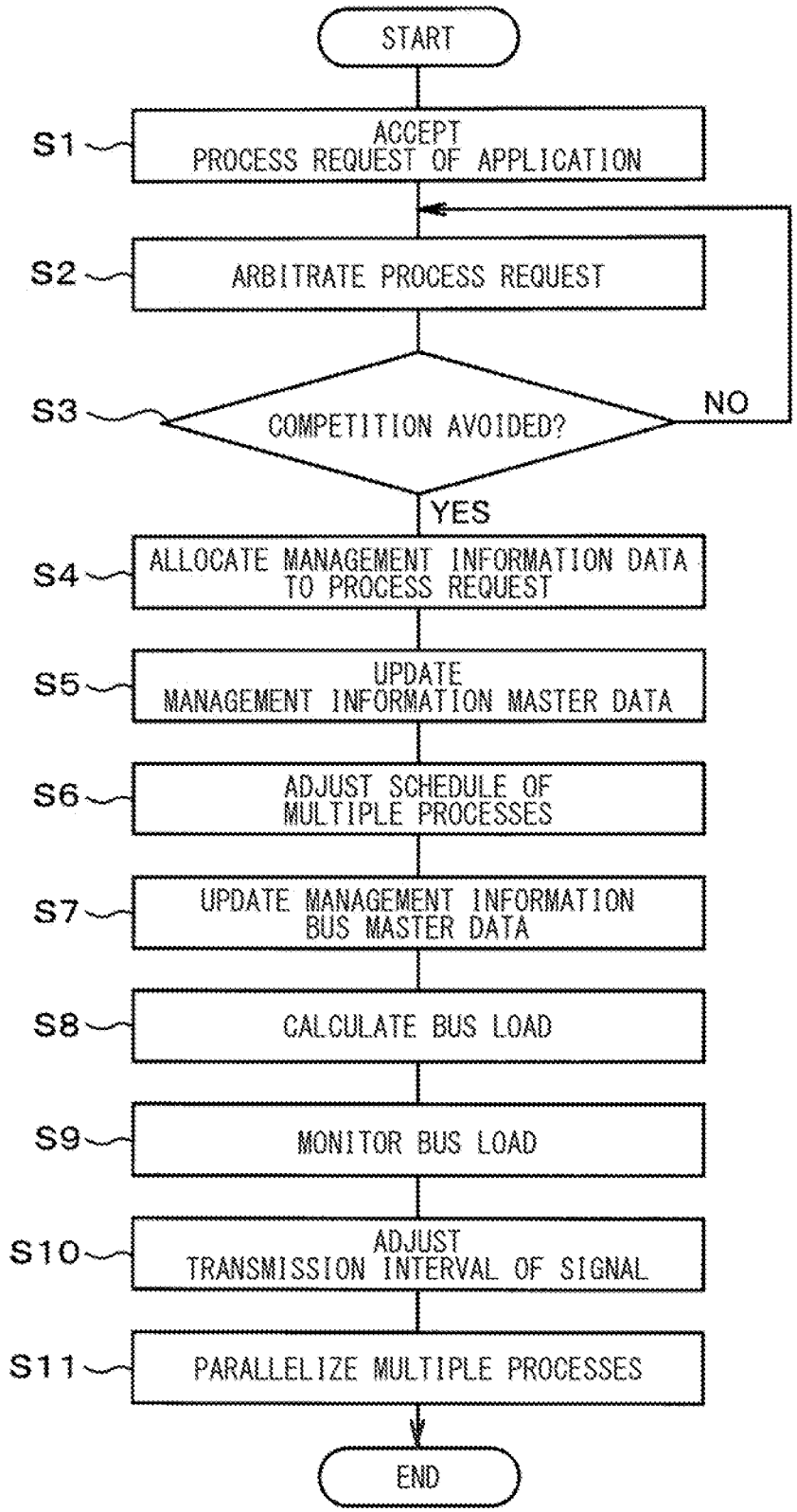
FIG. 6 is a flowchart showing an entire process.

Here, a reason for monitoring the session state is described. As shown in FIG. 5, upon receiving a session transition request signal in a normal state, the ECU transits from the normal state to a malfunction diagnosis state. After that, a predetermined time at which the ECU does not receive the malfunction diagnosis request signal (for example, five seconds) elapses, and a timeout occurs. The ECU returns from the malfunction diagnosis state to the normal state. Due to this situation, the client program 23 periodically transmits the session transition request signal to the ECU. Thereby, the ECU may be possible to maintain the malfunction diagnosis state even when the interval for transmitting the malfunction diagnosis request signal is longer than the predetermined time.

Upon receiving the session transition request signal in the malfunction diagnosis state, the ECU transits from the malfunction diagnosis state to the reprograming state. After that, a predetermined time at which the ECU does not receive a data signal including reprograming data (for example, five seconds) elapses, and a timeout occurs. The ECU returns from the reprograming state to the normal state. Due to this situation, the client program 23 periodically transmits the session transition request signal to the ECU. Thereby, the ECU may be possible to maintain the reprograming state even when the interval for transmitting the data signal including the reprograming data is longer than the predetermined time.

Next, operation of the above described configuration is described with reference to FIGS. 6 to 27.

In the CGW 3, the microcomputer 15 performs the following control by the CPU 18 executing the client program 23.

When the process request acceptance section 27 accepts the process request of the application (S1, a process request reception procedure), the microcomputer 15 arbitrates the accepted process request of the application (S2, an arbitration procedure). That is, the microcomputer 15 uses the data regarding to the priority of the process request of the application being accepted, the data regarding to the state of the buses 7 to 10, the data regarding to the states of the ECUs 11a to 11c, 12a to 12c, 13a to 13c, and 14a to 14c, and determines whether the process in accordance with the accepted process request can be executed. The microcomputer 15 arbitrates the process request of the application. The microcomputer 15 determines whether to avoid competition of the application by arbitrating the accepted process request of the application (S3), determines to avoid the competition of the application (S3: YES), allocates the management information data to the process request (S4).

The microcomputer 15 allocates the management information data to the process request, and updates the management information master data (S5). The microcomputer 15 adjusts the schedule of the multiple processes in accordance with the multiple process requests (S6). After adjusting the schedule of the multiple processes, the microcomputer 15 updates the management information bus master data (S7). The microcomputer 15 calculates the bus load (S8), monitors the bus load (S9), and adjusts the transmission interval of the signal transmitted to the ECU corresponding to the request destination of the process request (S10). The microcomputer 15 parallelizes the multiple processes while monitoring the progress state and the session state (S11, a process parallel procedure).

Hereinafter, as a connection mode of the ECU, a case where the multiple process requests to the same ECU connected with the bus are simultaneously accepted, a case where the multiple process requests to the multiple ECUs connected with the same bus are simultaneously accepted, and a case where the multiple process requests to the multiple electronic control apparatuses connected with the different buses are simultaneously accepted, are described.

Figure 7:
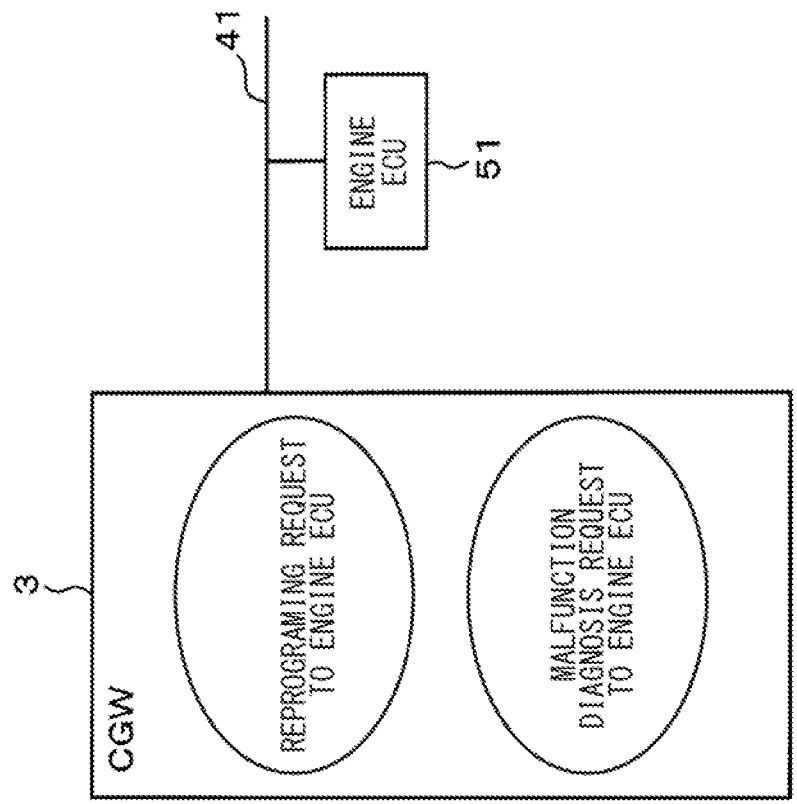
FIG. 7 is a diagram showing a connection mode.
Figure 8:
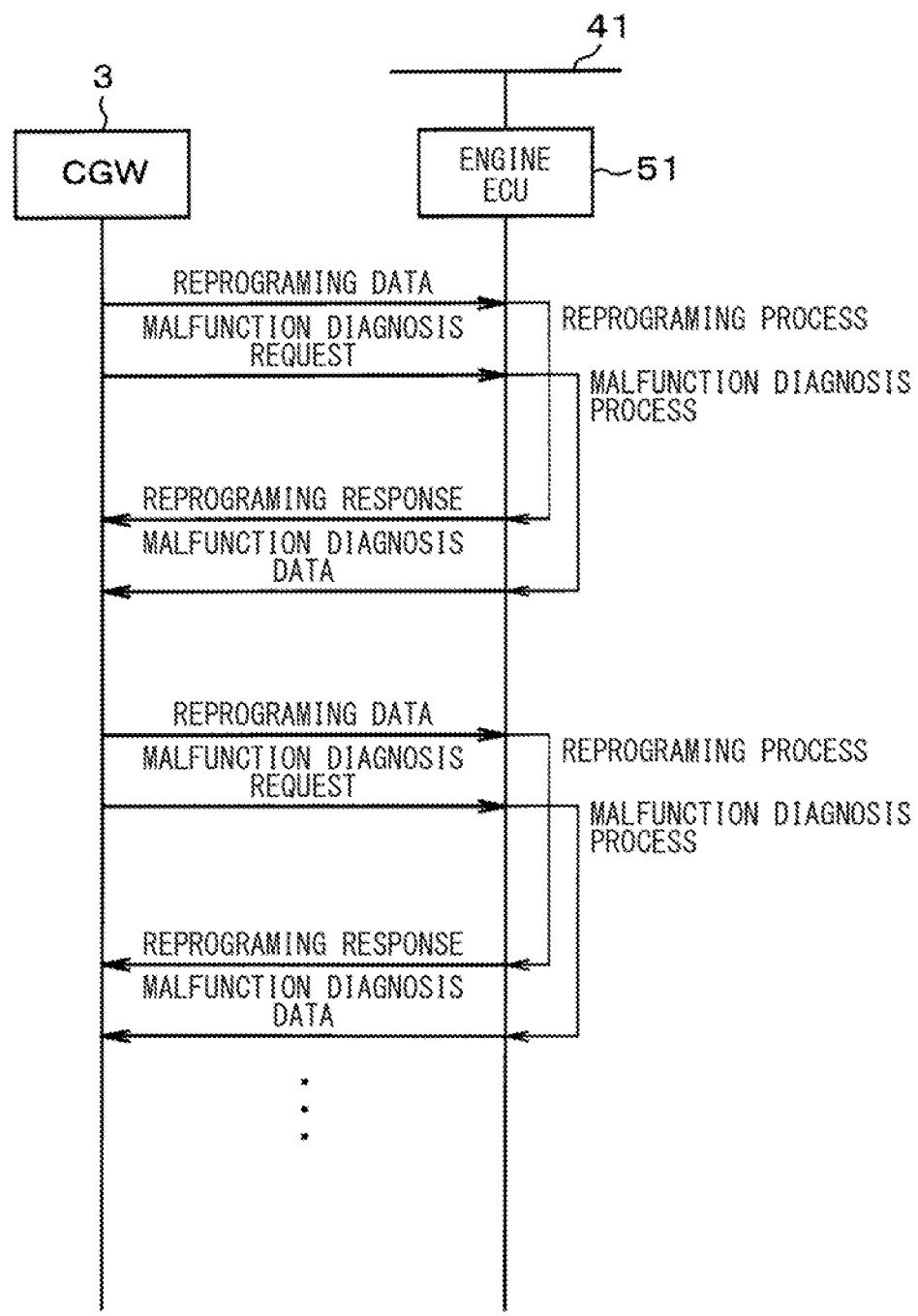
FIG. 8 is a sequence diagram.

(1) Case where the multiple process requests to the same ECU connected with the bus are simultaneously accepted As shown in FIG. 7, the CGW 3 is connected with a bus 41, and the bus 41 is connected with an engine ECU 51. Upon simultaneously accepting the process request of the reprograming application and the process request of the malfunction diagnosis application to the engine ECU 51, the microcomputer 15 arbitrates the process requests. As shown in FIG. 8, the microcomputer 15 parallelizes transmission of the data signal including the reprograming data and transmission of the malfunction diagnosis request signal. In this case, simultaneously accepting means a case where the process request of the malfunction diagnosis application is accepted while the reprograming process in accordance with the process request of the reprograming application is executed or a case where the process request of the reprograming application is accepted while the malfunction diagnosis process in accordance with the process request of the malfunction diagnosis application is executed.

When the microcomputer 15 determines that the transmission of the malfunction diagnosis request signal does not interfere with the load of the engine ECU 51 and the load of the bus 41 (for example, another process or another bus communication is not prevented, or the like) in a term until the microcomputer 15 receives the reprograming response signal from when transmitting the data signal including the reprograming data, the microcomputer 15 transmits the malfunction diagnosis request signal in the term. When the microcomputer 15 determines that the transmission of the data signal including the reprograming data does not interfere with the load of the engine ECU 51 and the load of the bus 41 in a term until the microcomputer 15 receives the data signal including the malfunction diagnosis data (for example, various data such as DTC code) from when transmitting the malfunction diagnosis request signal, the microcomputer 15 transmits the data signal including the reprograming data in the term. In this way, the microcomputer 15 executes the reprograming process and the malfunction diagnosis process to the engine ECU 51 in the multitask. That is, the microcomputer 15 executes the multitasking according to the load of the engine ECU 51 and the load of the bus 41, instead of that the microcomputer 15 does not start the other process after waiting for one completion of the reprograming process and the malfunction diagnosis process to the engine ECU 51. Thereby, it may be possible to shorten the time required for the completion of the processes.

Figure 9:
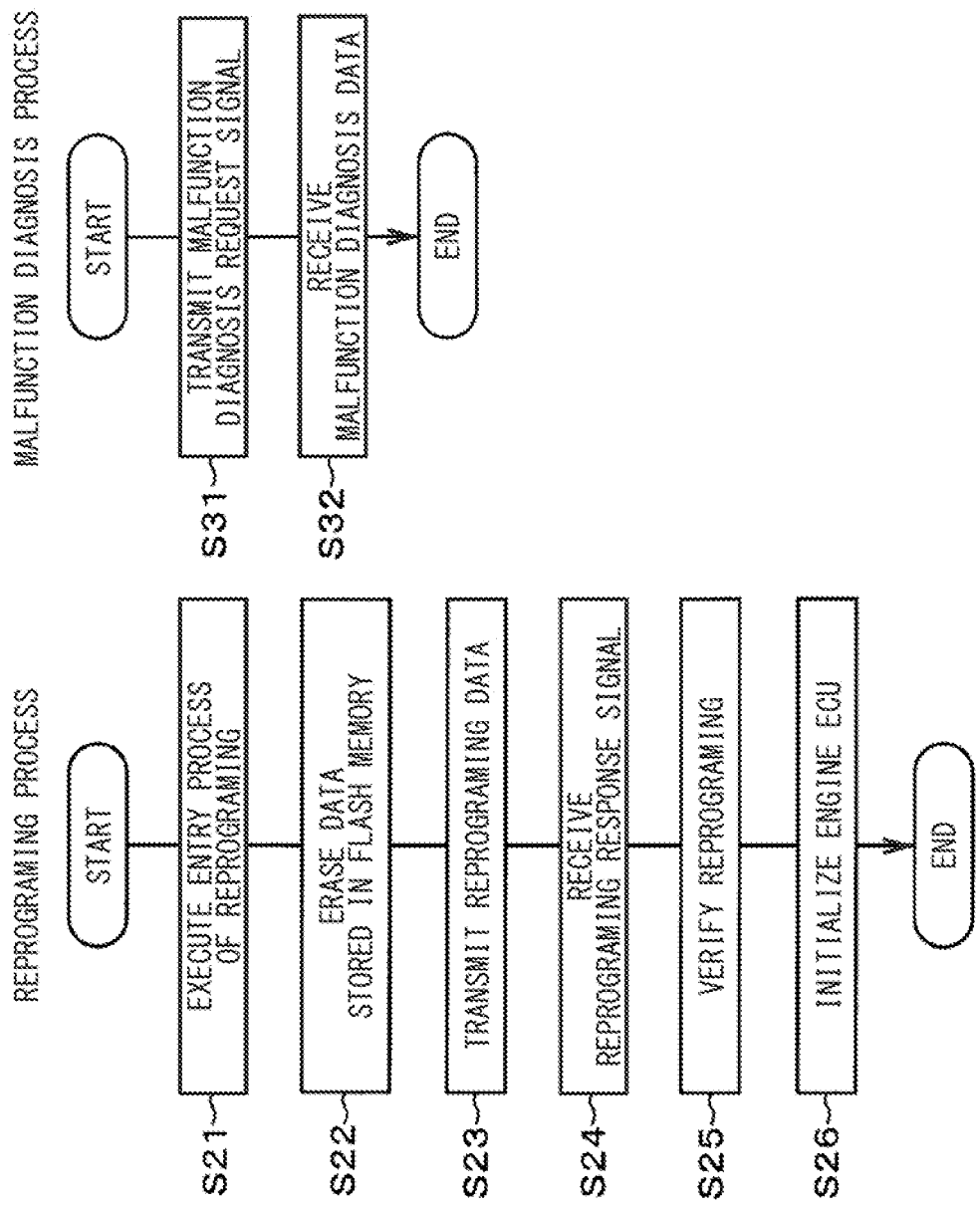
FIG. 9 is a flowchart.

As show in FIG. 9, the microcomputer 15 executes, as the reprograming process to the engine ECU 51, an entry process of the reprograming process (S21), erasing of data stored in a flash memory of the engine ECU 51 (S22), a transmission of the data signal including the reprograming data (S23), a reception of the reprograming response signal (S24), a verification of the reprograming process (S25), and an initialization of the engine ECU 51 (S26). The microcomputer 15 executes, as the malfunction diagnosis process to the engine ECU 51, a transmission of the malfunction diagnosis request signal (S31), and a reception of the data signal including the malfunction diagnosis data (S32).

Figure 10:
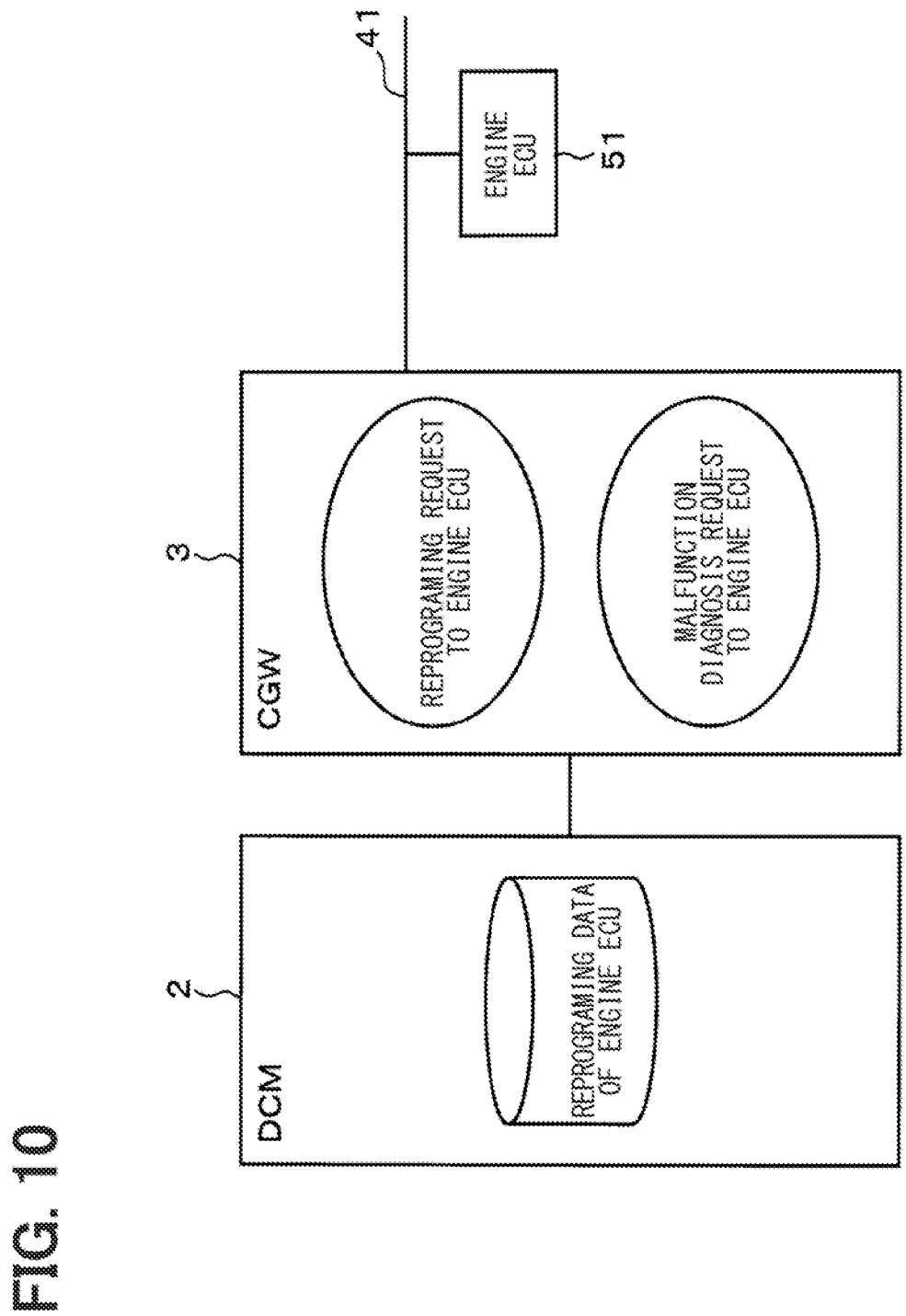
FIG. 10 is a diagram showing a connection mode.
Figure 11:
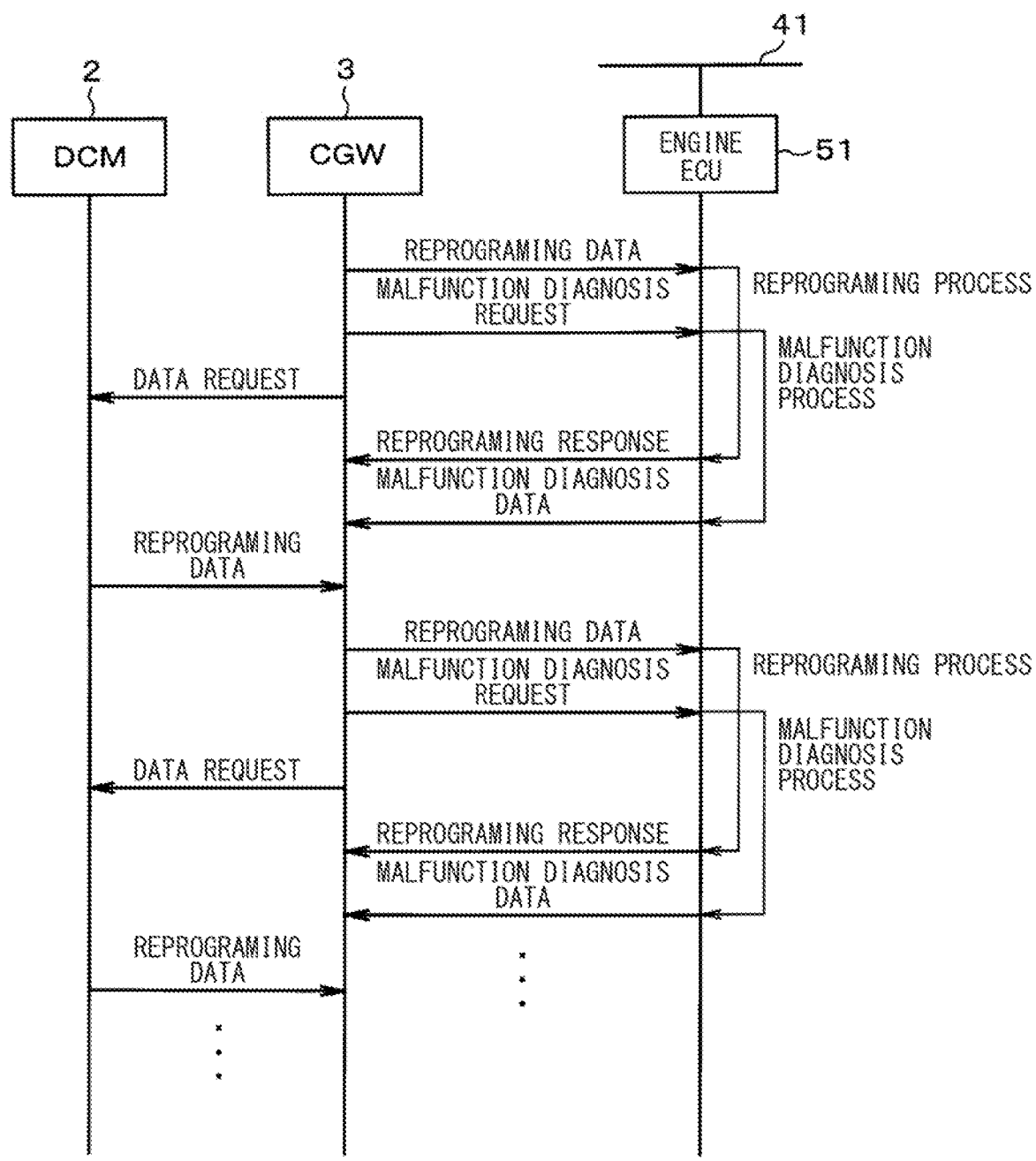
FIG. 11 is a sequence diagram.

The microcomputer 15 may parallelize the reception of the reprograming data from the DCM 2, in addition to the transmission of the data signal including the reprograming data and the transmission of the malfunction diagnosis request signal. That is, as shown in FIG. 10, it is assumed that the DCM 2 is configured to store the reprograming data of the engine ECU 51. As show in FIG. 11, for example, the microcomputer 15 transmits the request signal of the reprograming data to the DCM 2 in the term until the microcomputer 15 receives the reprograming response signal from when transmitting the malfunction diagnosis request signal. The microcomputer 15 receives the data signal including the reprograming data from the DCM 2 in the term until the microcomputer 15 transmits the data signal including the reprograming data from when receiving the data signal including the malfunction diagnosis data.

Figure 12:
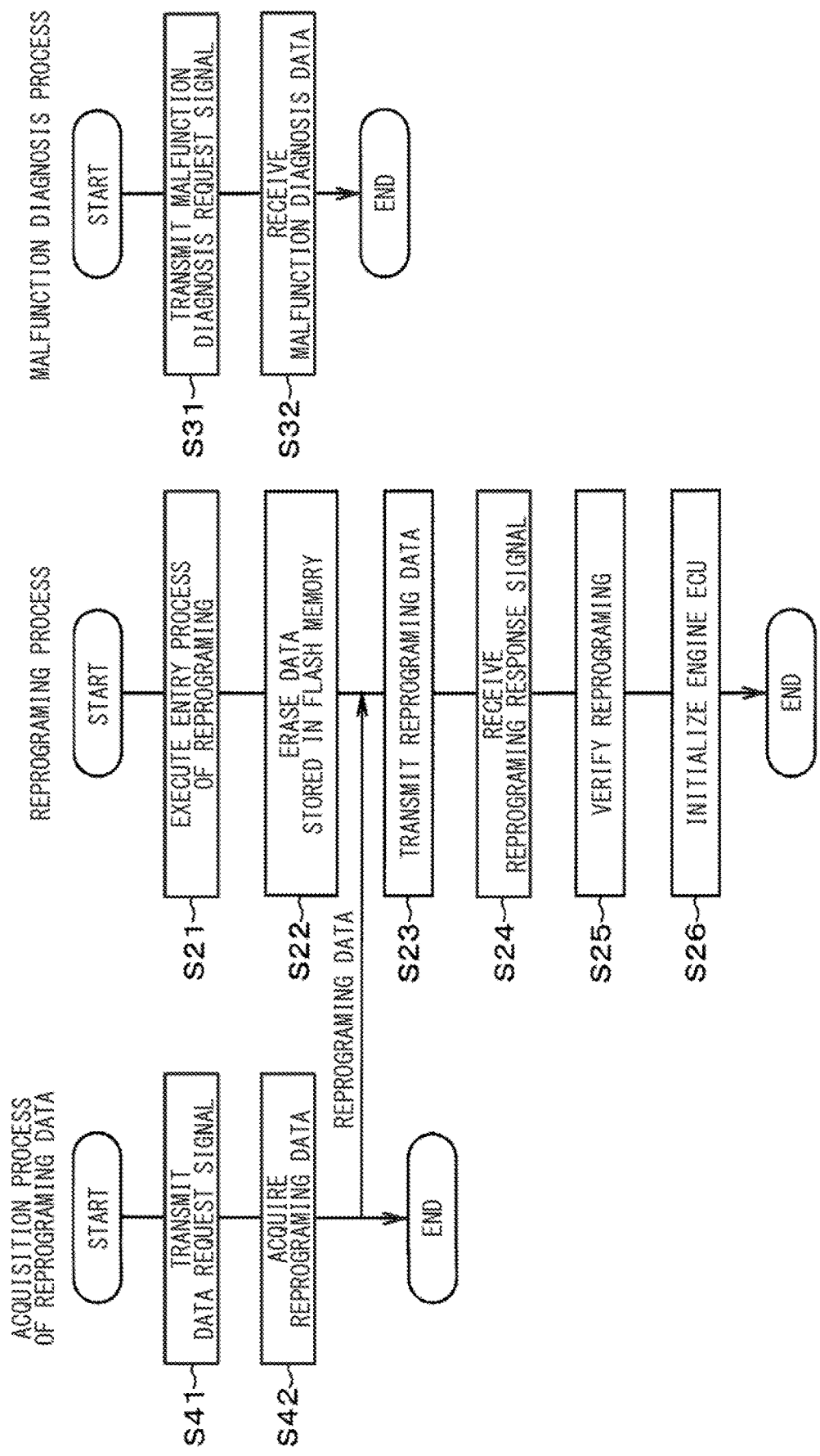
FIG. 12 is a flowchart.

In this way, the microcomputer 15 executes the reprograming process in accordance with the process request of the reprogram application to the engine ECU 51, the malfunction diagnosis process in accordance with the process request of the malfunction diagnosis application, and the process of acquiring the reprograming data from the DCM 2 in the multitask. As a process of acquiring the reprograming data, the microcomputer 15 executes transmission of a data request signal (S41), and acquisition of a data signal including the reprograming data (S42), as shown in FIG. 12.

In this configuration, since the CGW 3 transmits the reprograming data acquired from the DCM 2 to the engine ECU 51, it may be possible to reduce the capacity of a storage medium for storing the reprograming data transmitted to the engine ECU 51. The timing of transmitting the data request signal to the DCM 2 and the timing of receiving the data signal including the reprograming data from the DCM 2 may be any timing. Although the case where two process requests to the engine ECU 51 are simultaneously accepted has been described above, the same applies to a case where three or more process requests to the engine ECU 51 are simultaneously accepted.

Figure 13:
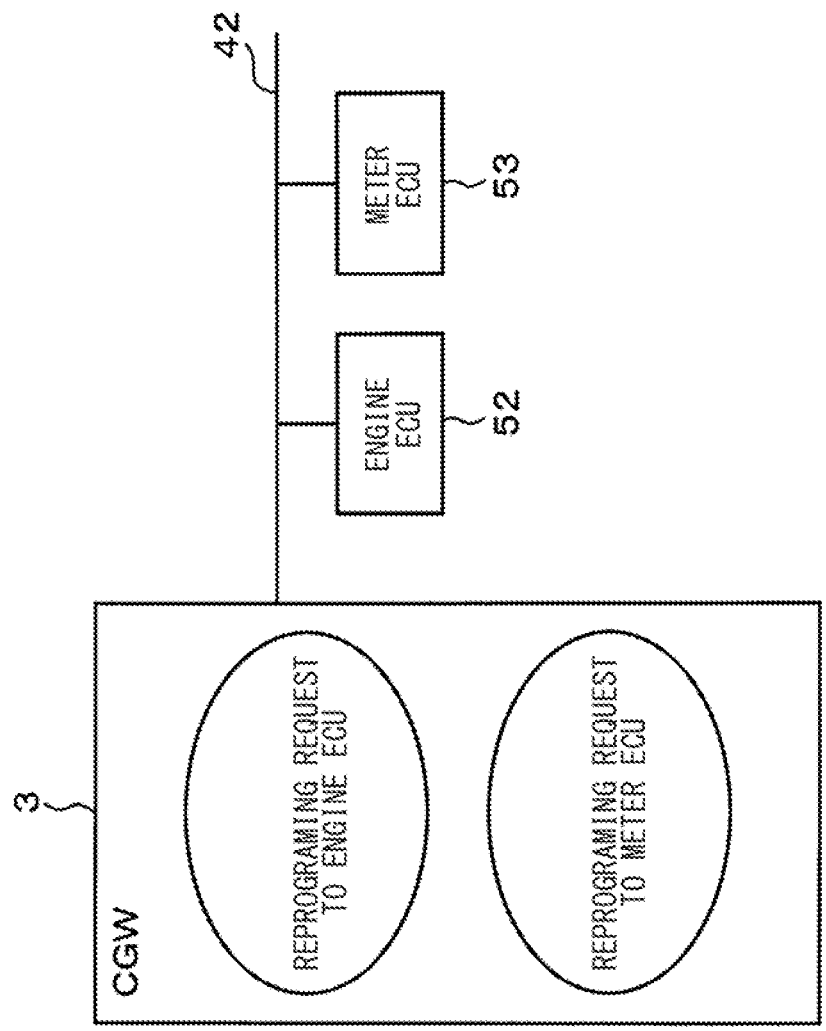
FIG. 13 is a diagram showing a connection mode.
Figure 14:
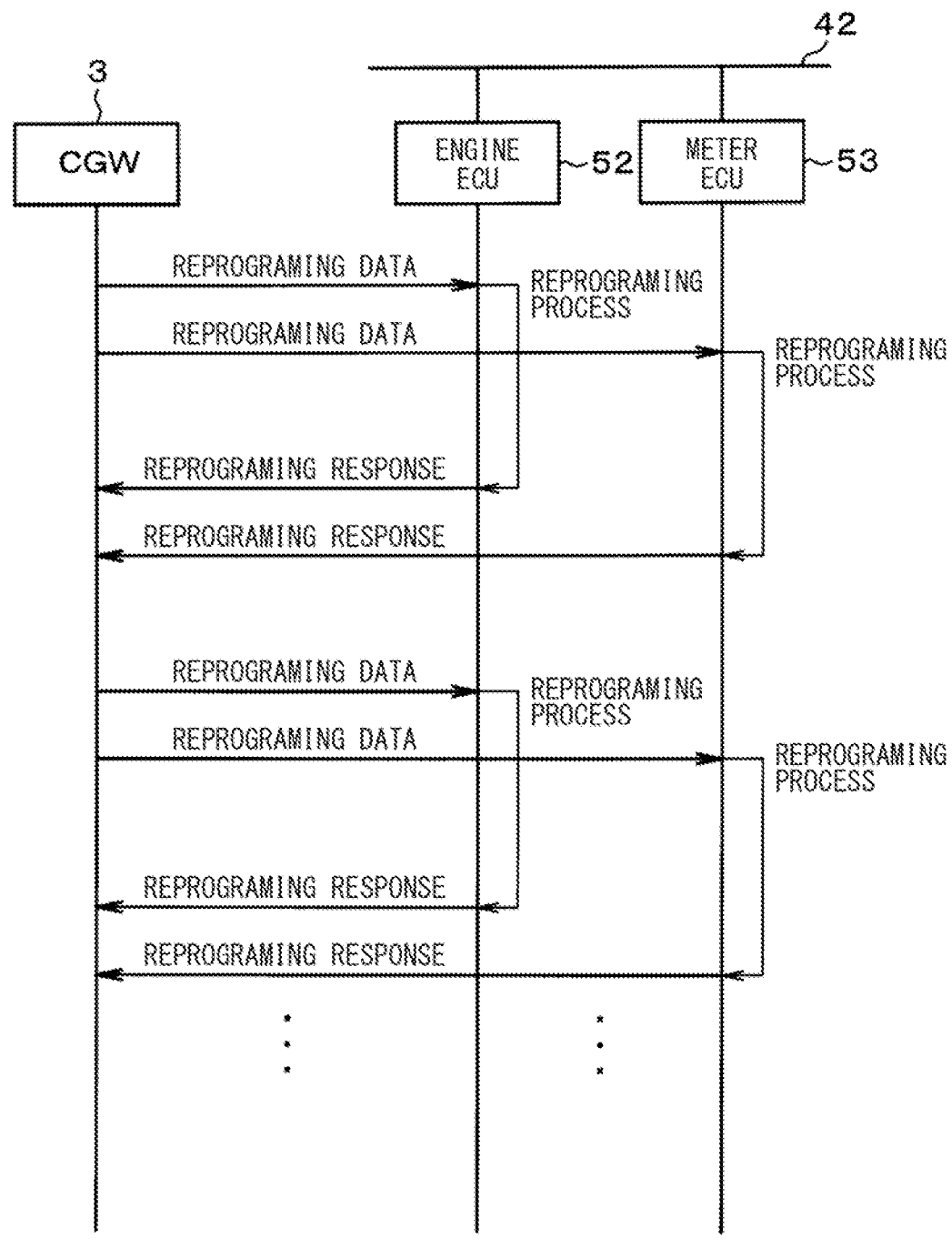
FIG. 14 is a flowchart.
Figure 15:
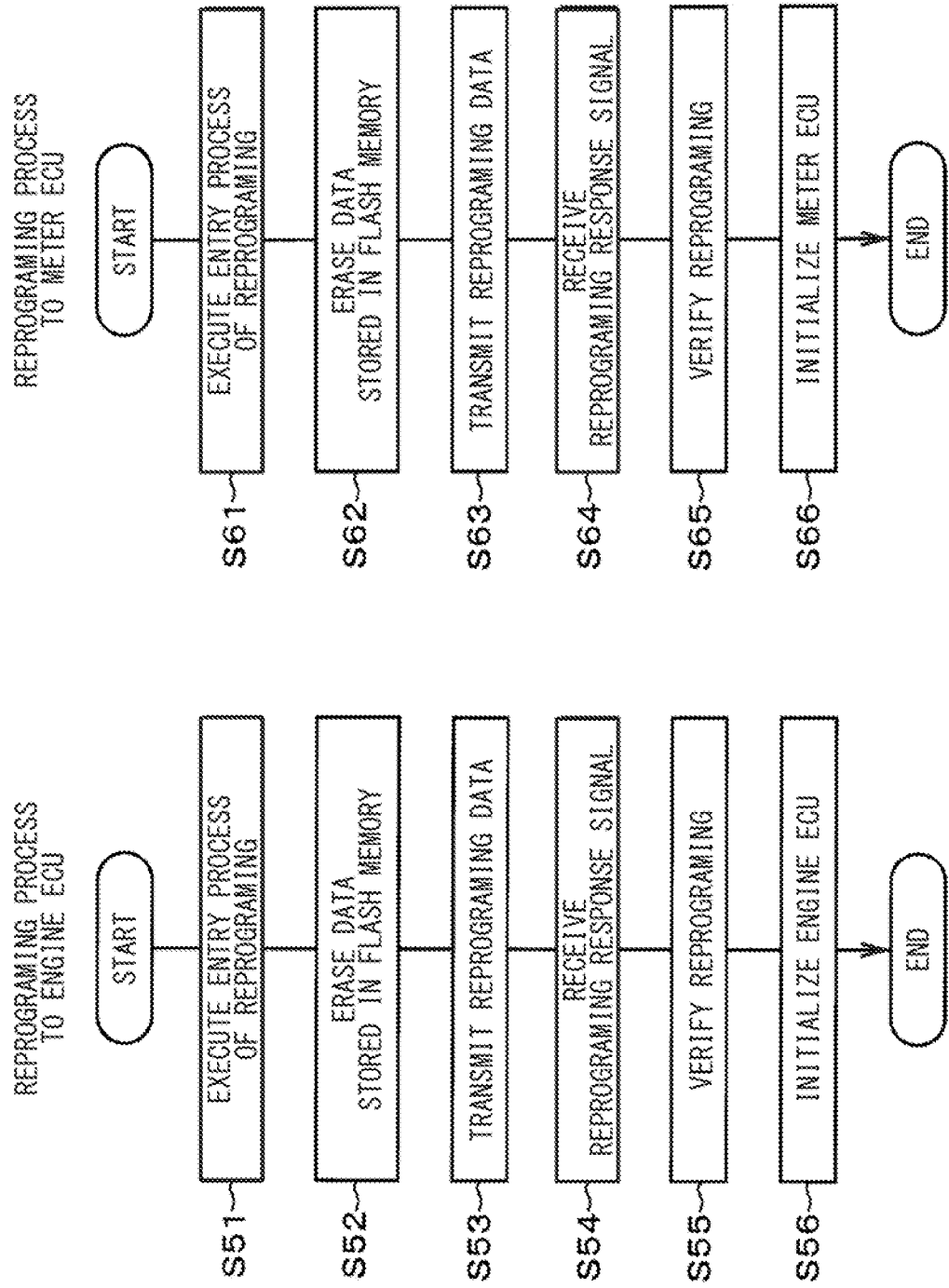
FIG. 15 is a flowchart.

(2) Case where the multiple process requests to the multiple ECU connected with the same bus are simultaneously accepted As shown in FIG. 13, the CGW 3 is connected with a bus 42, and the bus 42 is connected with an engine ECU 52 and a meter ECU 53. Upon simultaneously accepting the process request of the reprograming application to the engine ECU 52 and the process request of the reprograming application to the meter ECU 53, the microcomputer 15 arbitrates the process requests. As shown in FIG. 14, the microcomputer 15 parallelizes transmission of the data signal including the reprograming data of the engine ECU 52 and the transmission of the data signal including the reprograming data of the meter ECU 53. In this case, to simultaneously accept means a case where the process request of the reprograming application to the meter ECU 53 is accepted while the reprograming process in accordance with the process request of the reprograming application to the engine ECU 52 is executed or a case where the process request of the reprograming application to the engine ECU 52 is accepted while the reprograming process in accordance with the process request of the reprograming application to the meter ECU 53.

When the microcomputer 15 determines that the transmission of the data signal including the reprograming data of the meter ECU 53 does not interfere with the load of the meter ECU 53 and the load of the bus 42 in a term until the microcomputer 15 receives the reprograming response signal from when transmitting the data signal including the reprograming data of the engine ECU 52, the microcomputer 15 transmits the data signal including the reprograming data of the meter ECU 53 in the term. When the microcomputer 15 determines that the transmission of the data signal including the reprograming data of the engine ECU 52 does not interfere with the load of the engine ECU 52 and the load of the bus 42 in a term until the microcomputer 15 receives the reprograming response signal from when transmitting the data signal including the reprograming data of the meter ECU 53, the microcomputer 15 transmits the data signal including the reprograming data of the engine ECU 52 in the term.

In this way, the microcomputer 15 executes the reprograming process to the engine ECU 52 and the reprograming process to the meter ECU 53 in the multitask. That is, the microcomputer 15 executes the multitasking according to the load of the engine ECU 52, the meter ECU 53, and the load of the bus 42, instead of that the microcomputer 15 does not start the other process after waiting for one completion of the reprograming process to the engine ECU 52 and the reprograming process to the meter ECU 53. Thereby, it may be possible to shorten the time required for the completion of the processes. As show in FIG. 15, the microcomputer 15 executes, as the reprograming process to the engine ECU 52, an entry process of the reprograming process (S51), erasing of data stored in a flash memory of the engine ECU 52 (S52), transmission of the data signal including the reprograming data (S53), reception of the reprograming response signal (S54), verification of the reprograming process (S55), and initialization of the engine ECU 52 (S56). The microcomputer 15 executes, as the reprograming process to the meter ECU 53, an entry process of the reprograming process (S61), erasing of data stored in a flash memory of the meter ECU 53 (S62), transmission of the data signal including the reprograming data (S63), reception of the reprograming response signal (S64), verification of the reprograming process (S65), and initialization of the meter ECU 53 (S66).

Figure 16:
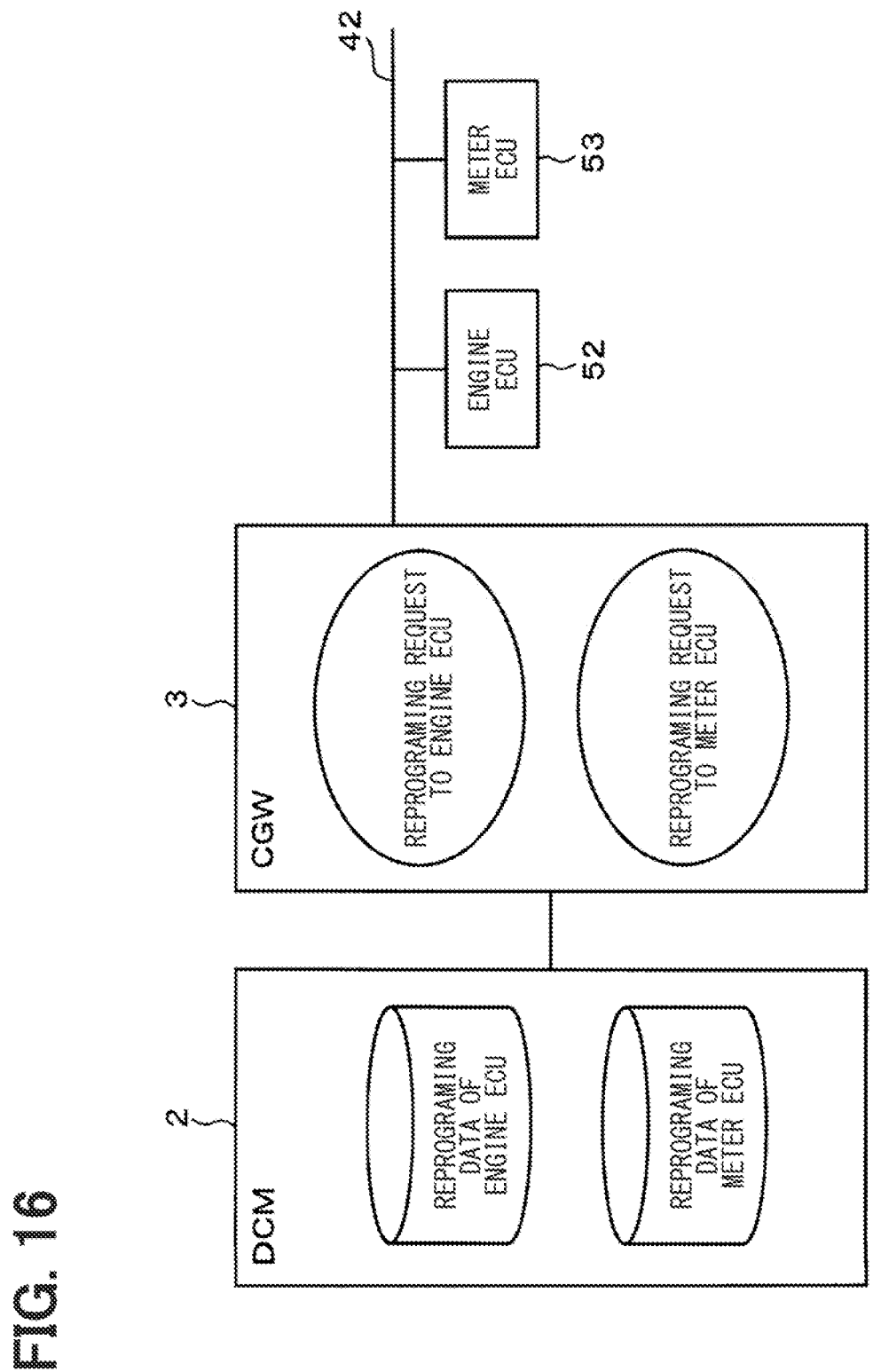
FIG. 16 is a diagram showing a connection mode.
Figure 17:
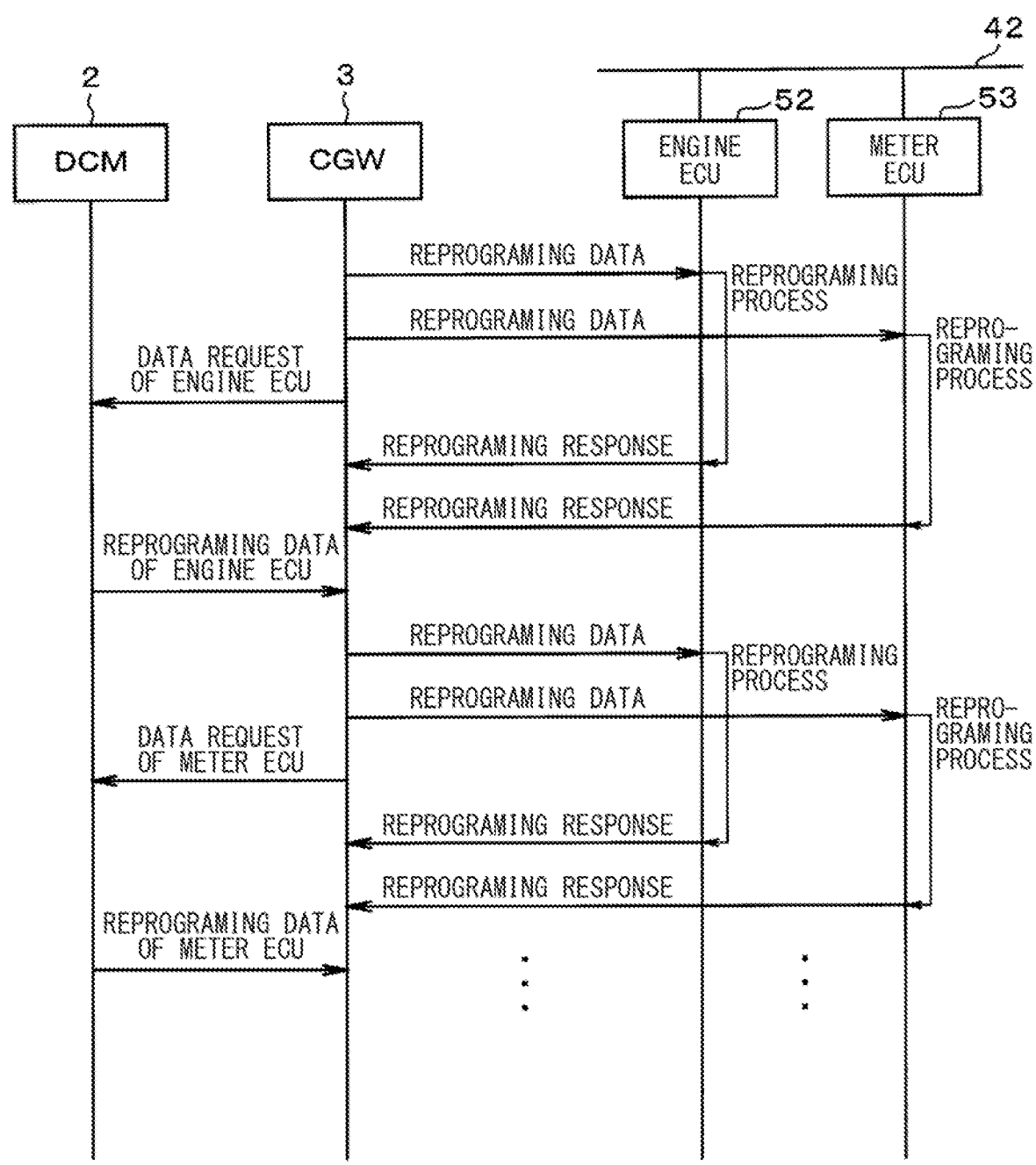
FIG. 17 is a sequence diagram.
Figure 18:
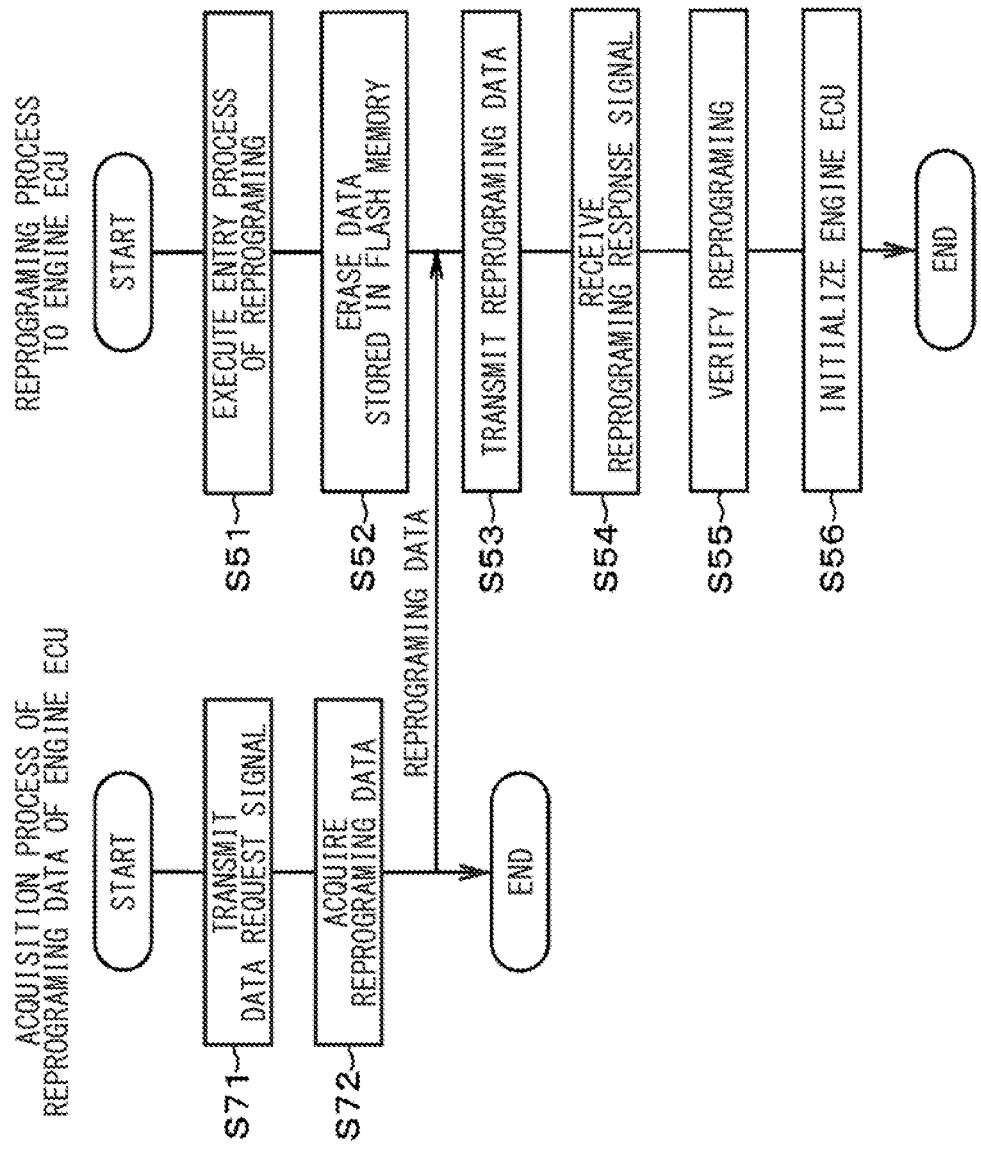
FIG. 18 is a flowchart.
Figure 19:
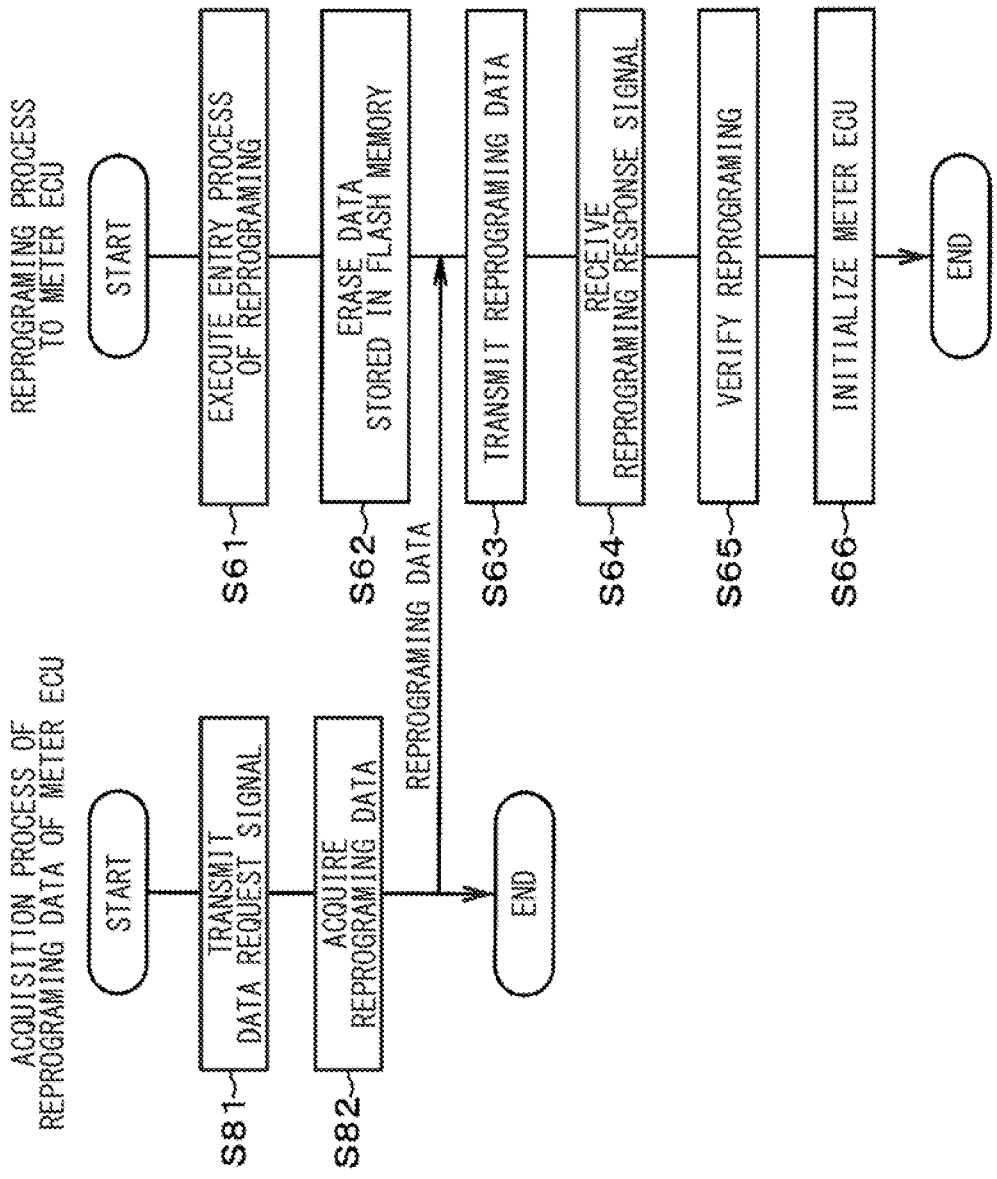
FIG. 19 is a flowchart.

In this case too, the microcomputer 15 may parallelize the reception of the reprograming data from the DCM 2, in addition to the transmission of the data signal including the reprograming data. That is, as shown in FIG. 16, in a case of a configuration that the reprograming data of the engine ECU 52 and the reprograming data of the meter ECU 53 are stored in the DCM 2, the microcomputer 15 may parallelize the reprograming process to the engine ECU 52 and the reprograming process to the meter ECU 53 and the acquisition process of the reprograming data, as shown in FIGS. 17 to 19. As shown in FIG. 18, the microcomputer 15 executes, as a process of acquiring reprograming data of the engine ECU 52, transmission of a data request signal (S71), and acquisition of a data signal including reprograming data (S72). As shown in FIG. 19, the microcomputer 15 executes, as a process of acquiring the reprograming data of the meter ECU 53, transmission of a data request signal (S81), and acquisition of a data signal including reprograming data (S82).

Even in the configuration, the CGW 3 transmits the reprograming data of the engine ECU 52 acquired from the DCM 2 to the engine ECU 52, and transmits the reprograming data of the meter ECU 53 acquired from the DCM 2 to the meter ECU 53. Therefore, it may be possible to reduce the capacity of the storage medium for storing the reprograming data transmitted to the engine ECU 52 and the reprograming data transmitted to the meter ECU 53. In this case too, the timing of transmitting the data request signal to the DCM 2 and the timing of receiving the data signal including the reprograming data from the DCM 2 may be any timing. Although the case where two process requests to the ECUs 52 and 53 that are connected with the same bus 42 are simultaneously accepted has been described above, the same applies to a case where three or more process requests to three or more ECUs are simultaneously accepted.

Figure 20:
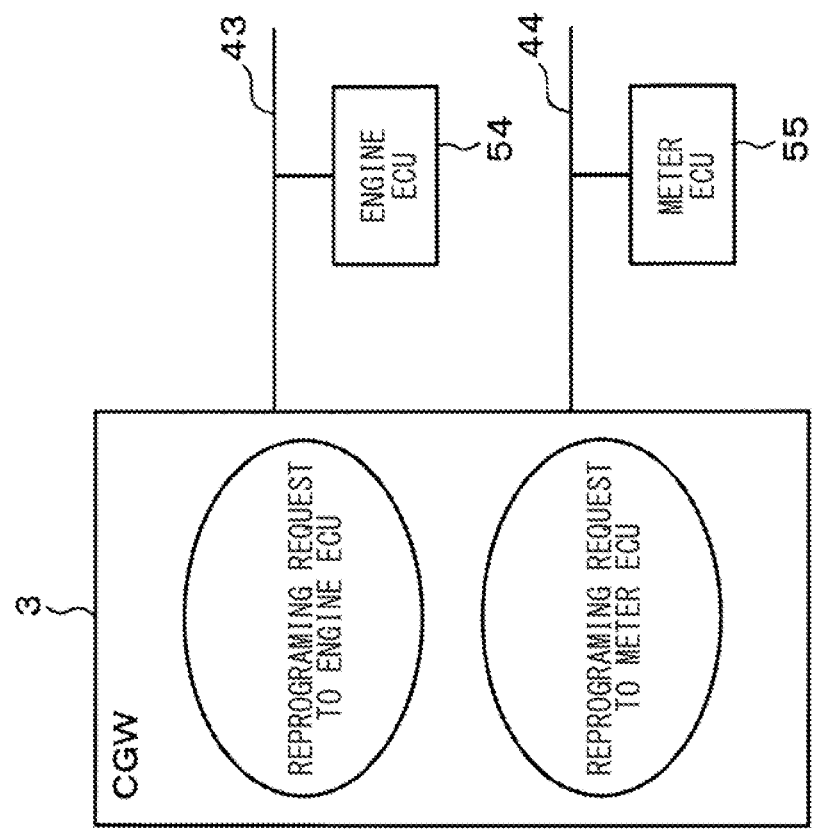
FIG. 20 is a diagram showing a connection mode.
Figure 21:
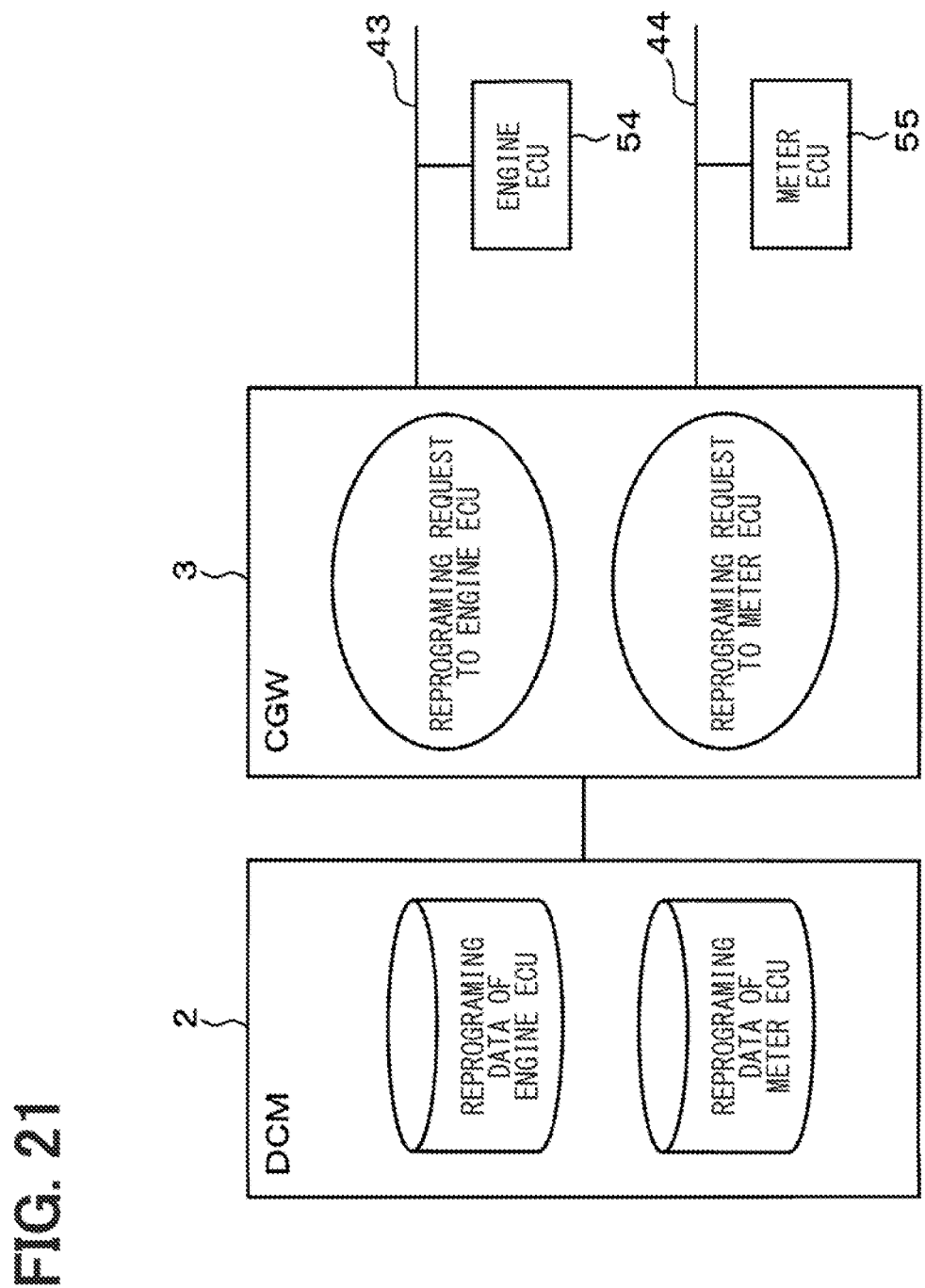
FIG. 21 is a diagram showing a connection mode.

(3) Case where the multiple process requests to the multiple ECU connected with the different buses are simultaneously accepted As shown in FIG. 20, the CGW 3 is connected with a first bus 43 and a second bus 44, and the first bus 43 is connected with an engine ECU 54 and the second bus 44 is connected with a meter ECU 55. Upon simultaneously accepting a process request of the reprograming application to the engine ECU 54 and a process request of the reprograming application to the meter ECU 55, the microcomputer 15 arbitrates the process requests. As shown in FIG. 21, the microcomputer 15 parallelizes transmission of the data signal including the reprograming data of the engine ECU 54 and transmission of the data signal including the reprograming data of the meter ECU 55. In this case, since the engine ECU 54 and the meter ECU 55 are connected with the different buses, the microcomputer 15 determines the communication speed of the bus. The microcomputer 15 parallelizes the transmission of the data signal including the reprograming data of the engine ECU 54 and the transmission of the data signal including the reprograming data of the meter ECU 55.

In this case too, as shown in FIG. 21, the microcomputer 15 may parallelize the reprograming process to the engine ECU 54, the reprograming process to the meter ECU 55, and the acquisition process of the reprograming data. Although the case where two process requests to the ECUs 54 and 55 that are separately connected with two buses 43 and 44 are simultaneously accepted has been described above, the same applies to a case where three or more process requests to three or more ECUs separately connected with the three or more buses are simultaneously accepted.

Figure 22:
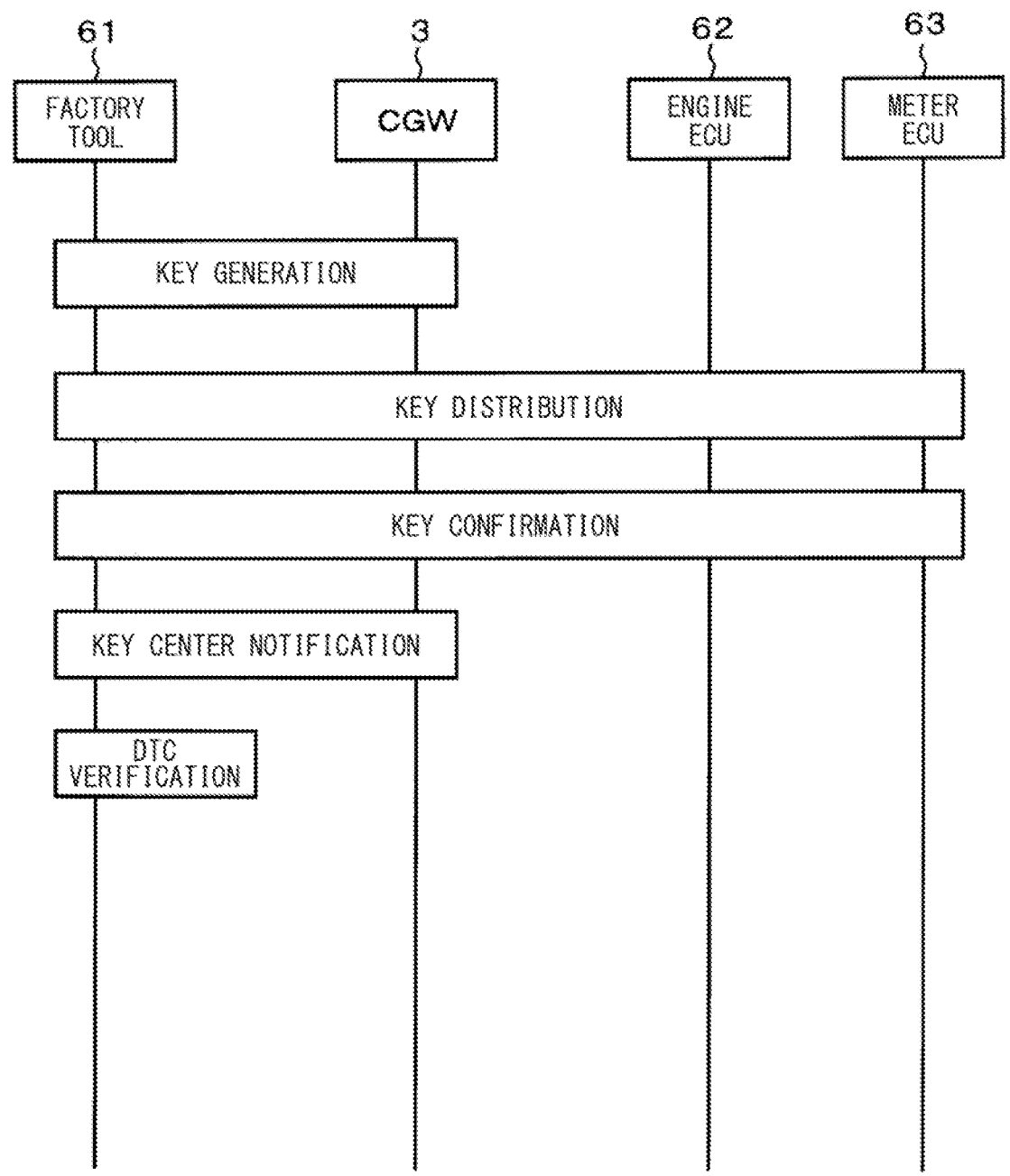
FIG. 22 is a sequence diagram.

Next, a key management application will be described with reference to FIGS. 22 to 27. Here, a case where the CGW 3 distributes keys to an engine ECU 62 and a meter ECU 63 is described. The engine ECU 62 and the meter ECU 63 may be connected with the same bus, or connected with the different buses. As shown in FIG. 22, the key management application includes a key generation phase, a key distribution phase, a key confirmation phase, a key center notification phase, and a DTC verification phase.

Figure 23:
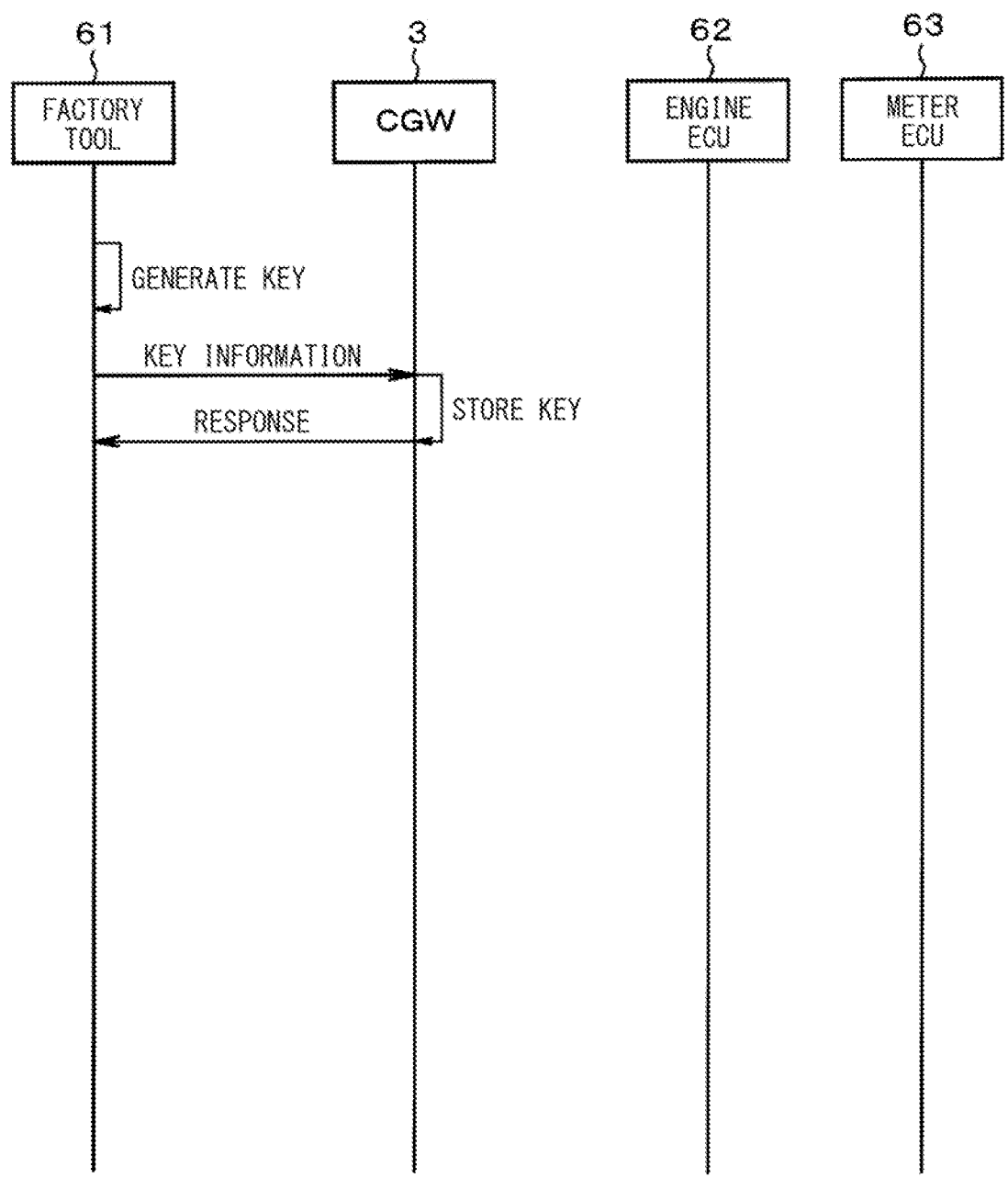
FIG. 23 is a sequence diagram.
Figure 24:
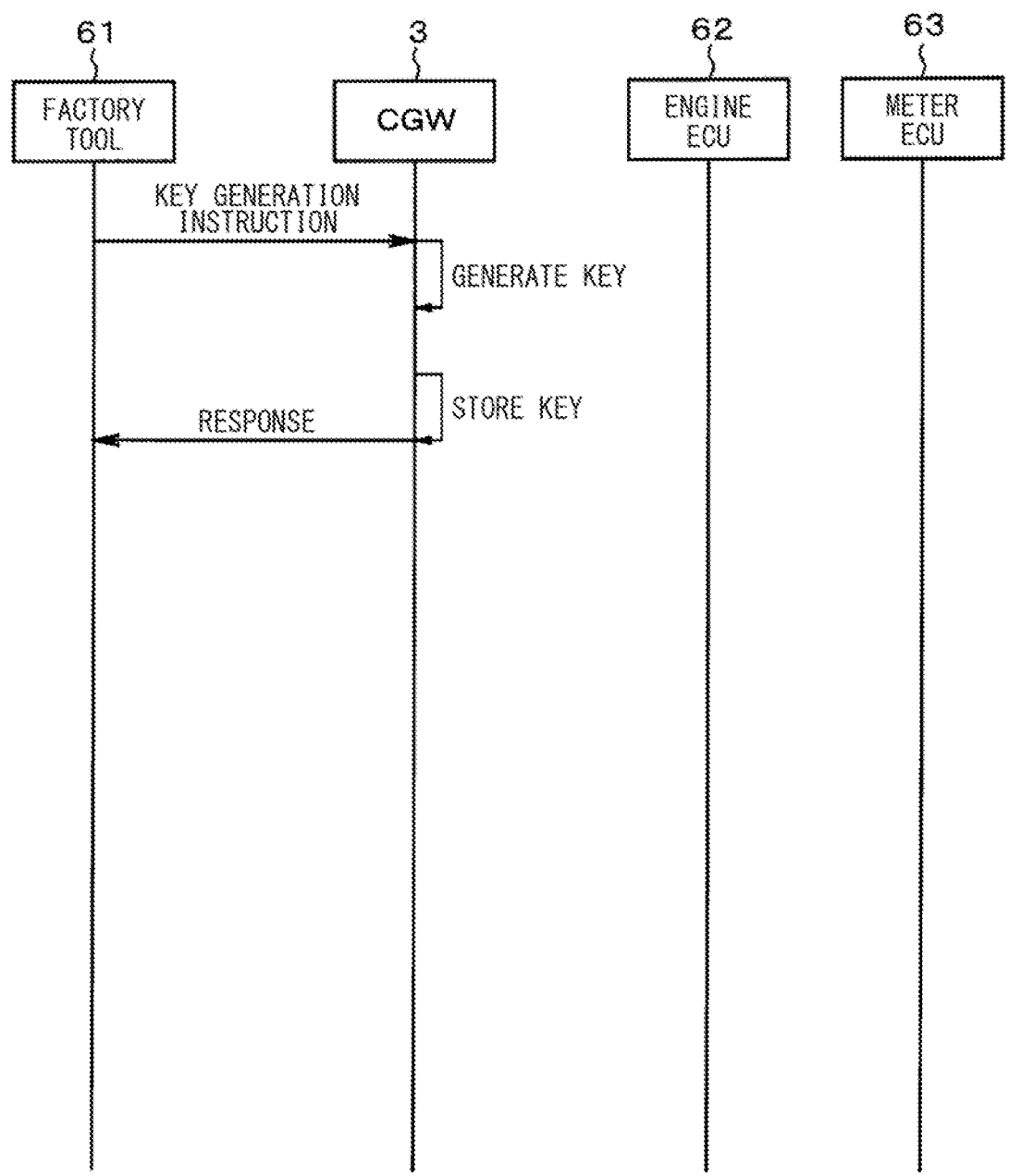
FIG. 24 is a sequence diagram.

The key generation phase includes a case where a factory tool 61 generates the key and a case where the CGW 3 generates the key. In the case where the factory tool 61 generates the key, as shown in FIG. 23, when the factory tool 61 generates the key, the factory tool 61 transmits a key information signal including key information capable of specifying the generated key to the CGW 3. In the CGW 3, when receiving the key information signal from the factory tool 61, the microcomputer 15 specifies the key from the key information included in the received key information signal, stores the specified key, and transmits a response signal to the factory tool 61. In the case where the CGW 3 generates the key, as shown in FIG. 24, the factory tool 61 transmits a key generation instruction signal to the CGW 3. In the CGW 3, when receiving the key generation instruction signal from the factory tool 61, the microcomputer 15 generates the key, stores the generated key, and transmits the response signal to the factory tool 61.

Figure 25:
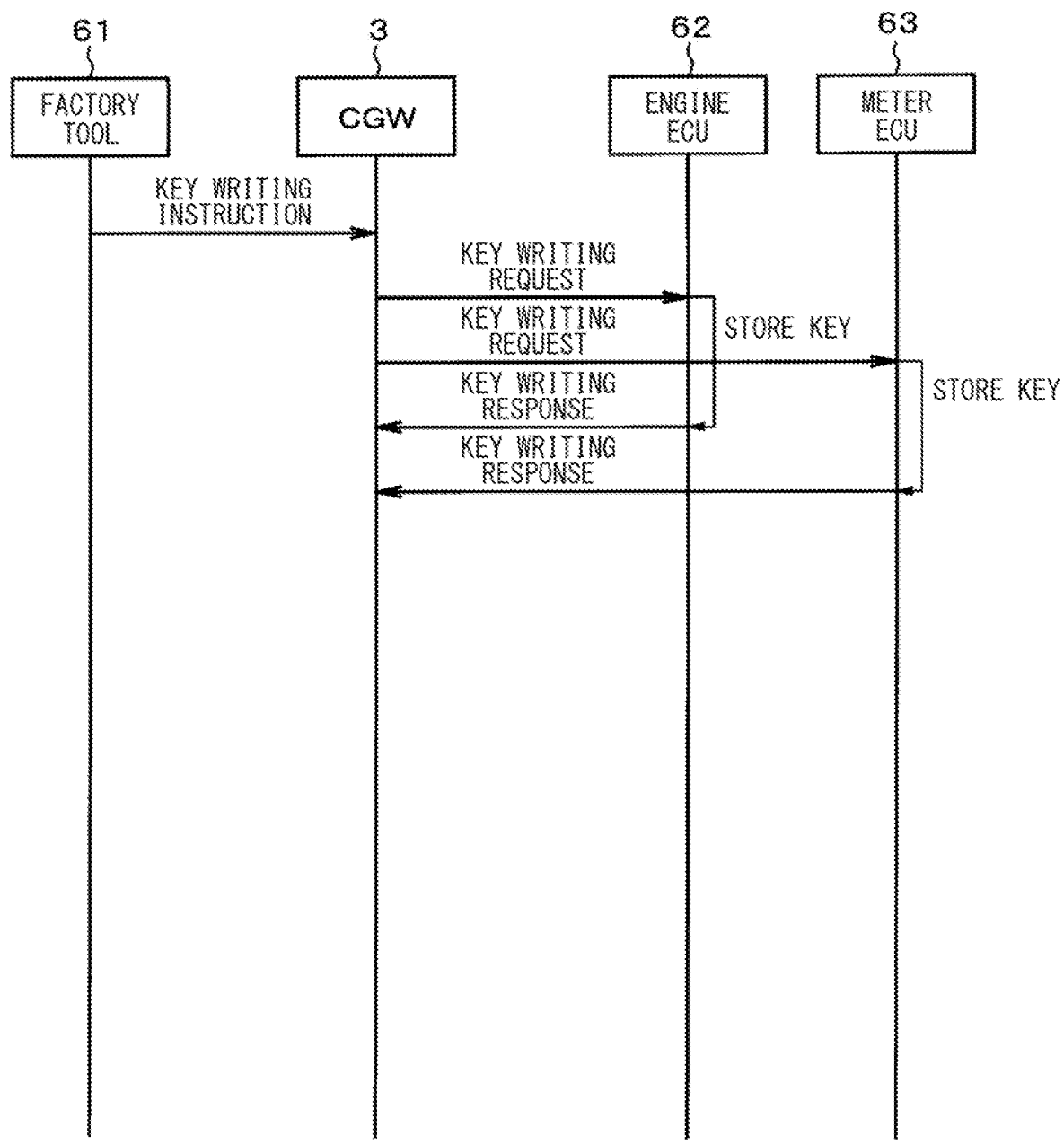
FIG. 25 is a sequence diagram.

In the key distribution phase, as shown in FIG. 25, the factory tool 61 transmits a key write instruction signal to the CGW 3. In the CGW 3, when receiving the key writing instruction signal from the factory tool 61, the microcomputer 15 reads the stored key and transmits a key writing request signal including the read key to the engine ECU 62 and the meter ECU 63. The microcomputer 15 parallelizes the transmission of the key writing request signal to the engine ECU 62 and the transmission to the meter ECU 63. Upon respectively receiving the key writing request signal from the CGW 3, the engine ECU 62 and the meter ECU 63 acquire the key included in the received key writing request signal to store the key, and transmit a key write response signal to the CGW 3. In this way, the microcomputer 15 executes a key distribution process to the engine ECU 62 and the key distribution process to the meter ECU 63 in the multitask. That is, the microcomputer 15 executes the multitasking according to the load of the engine ECU 62, the meter ECU 63, and the load of the bus, instead of that the microcomputer 15 does not start the other process after waiting for one completion of the key distribution process to the engine ECU 62 and the key distribution process to the meter ECU 63. Thereby, it may be possible to shorten the time required for the completion of the processes.

Figure 26:
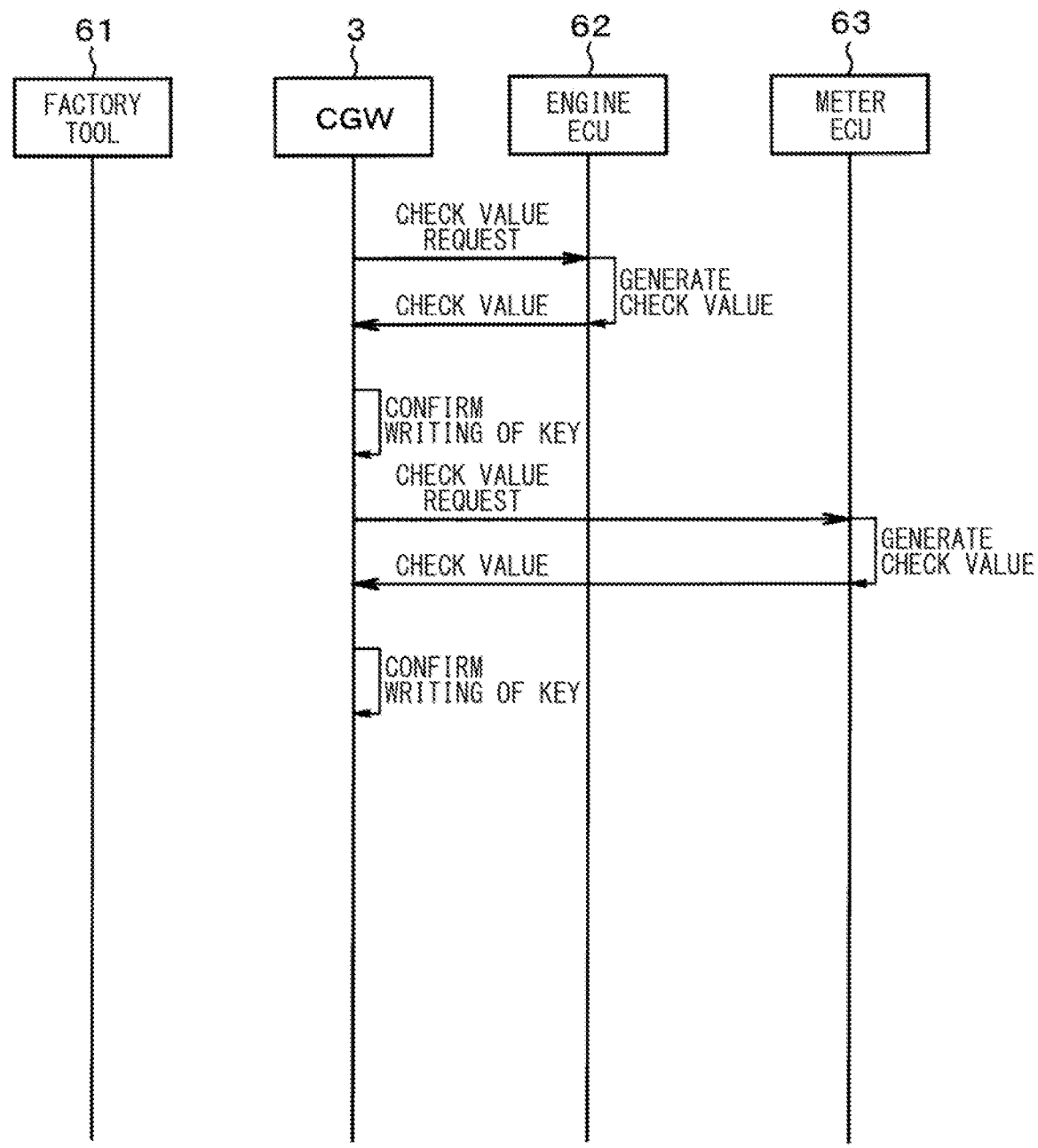
FIG. 26 is a sequence diagram.

The key confirmation phase includes a case where the CGW 3 confirms the key and a case where the factory tool 61 confirms the key in the DTC verification phase of the subsequent stage. In the case where the CGW 3 confirms the key, as shown in FIG. 26, in the CGW 3, the microcomputer 15 transmits a check value request signal to the engine ECU 62. Upon receiving the check value request signal from the CGW 3, the engine ECU 62 generates a check value and transmits a check value signal including the generated check value to the CGW 3. In the CGW 3, upon receiving the check value signal from the engine ECU 62, the microcomputer 15 determines the check value included in the received check value signal, and confirms whether writing of the key to the engine ECU 62 is normally completed. Upon completing confirmation of whether the writing of the key to the engine ECU 62 has been normally completed, the microcomputer 15 transmits a check value request signal to the meter ECU 63. The microcomputer 15 confirms whether the writing of the key to the meter ECU 63 is normally completed, according to the similar procedure.

Figure 27:
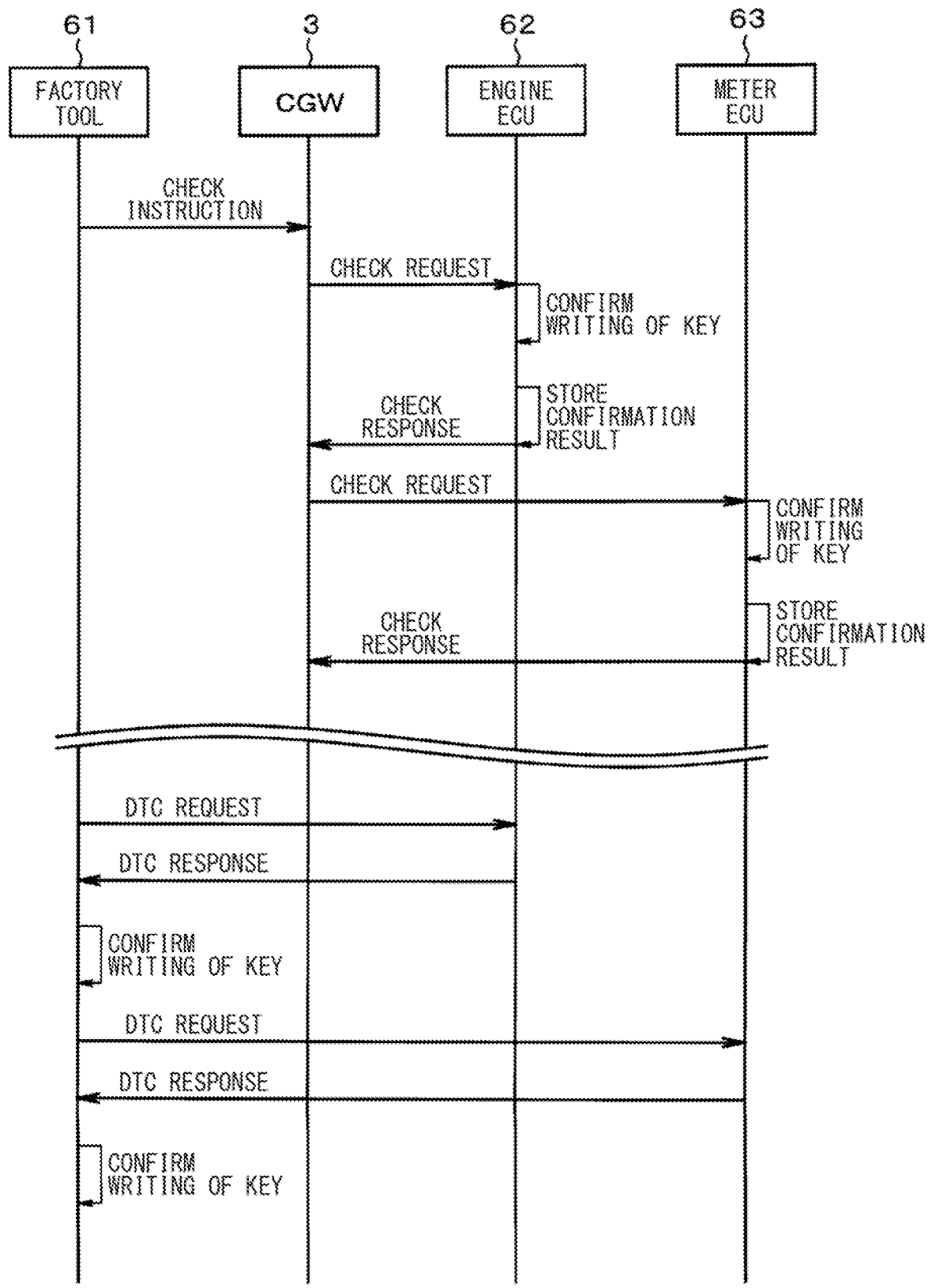
FIG. 27 is a sequence diagram.

In the case where the factory tool 61 confirms the key in the DTC verification phase of the subsequent stage, as shown in FIG. 27, the factory tool 61 transmits the check instruction signal to the CGW 3. In the CGW 3, upon receiving the check instruction signal from the factory tool 61, the microcomputer 15 transmits the check request signal to the engine ECU 62. Upon receiving the check request signal from the CGW 3, the engine ECU 62 confirms whether the writing of the key is normally completed, stores the check result, and transmits the check response signal to the CGW 3. In the CGW 3, upon receiving the check response signal from the engine ECU 62, the microcomputer 15 transmits the check request signal to the meter ECU 63, and confirms whether the writing of the key to the meter ECU 63 has been normally completed, according to the similar procedure. Thereafter, in the DTC verification phase, the factory tool 61 transmits the DTC request to the engine ECU 62, and receives the DTC response including the confirmation result from the engine ECU 62. The factory tool 61 determines the confirmation result included in the received DTC response, and confirms whether the writing of the key to the engine ECU 62 has been normally completed. Upon completing confirmation of whether the writing of the key to the engine ECU 62 has been normally completed, the factory tool 61 transmits the DTC request signal to the meter ECU 63. The factory tool 61 confirms whether the writing of the key to the meter ECU 63 is normally completed, according to the similar procedure.

The embodiment described above can provide effects described as below.

In the CGW 3, upon simultaneously accepting the process requests of the independent applications to the ECUs 11a to 11c, 12a to 12c, 13a to 13c, and 14a to 14c, the CGW 3 arbitrates the multiple process requests that have been accepted, and parallelizes the multiple processes in accordance with the multiple process requests. Thereby, it may be possible to execute the multiple processes in accordance with the multiple accepted process requests when simultaneously accepting the multiple process requests of the independent application.

The CGW 3 parallelizes the multiple processes in accordance with the process requests and the process of acquiring the reprograming data from the DCM 2. Thereby, it may be possible to acquire the reprograming data from the DCM 2 to transmit the acquired reprograming data to the ECUs 11a to 11c, 12a to 12c, 13a to 13c, and 14a to 14c. It may be possible to reduce the capacity of the storage medium for storing the reprograming data.

The CGW 3 uses the data regarding to the priority of the process request that has been accepted, the data regarding to the states of the buses 7 to 10, and the data regarding to the states of the ECUs 11a to 11c, 12a to 12c, 13a to 13c, and 14a to 14c, and arbitrates the multiple process requests. It may be possible to arbitrate the multiple processes based on the priority of the process request that has been accepted, the states of the buses 7 to 10, and the states of the ECUs 11a to 11c, 12a to 12c, 13a to 13c, and 14a to 14c, as indexes.

The CGW 3 parallelizes the multiple processes while monitoring the progress state of the process and the session state. It may be possible to execute the multiple processes in the multitask while appropriately dealing with the progress state of the process or the change of the session state.

Although the present disclosure has been described according to the embodiments, it is understood that the present disclosure is not limited to the embodiments and structures. The present disclosure may cover various modification examples and equivalent arrangements. Furthermore, various combinations and formations, and other combinations and formations including one, more than one or less than one element may be included in the scope and the spirit of the present disclosure.

It may be configured to accept an application other than the reprograming application, the malfunction diagnosis application, and the key management application.

The configuration in which the reprograming data is stored in the DCM 2 has been described. However, a configuration in which the storage device may be provided separately from the DCM 2, the reprograming data may be stored in the storage device, and the process of acquiring the reprograming data from the storage device may be executed.

In the present disclosure, a process request acceptance section accepts a process request of an independent application to an electronic controller. A process execution section arbitrates the multiple process requests to parallelize multiple processes in accordance with the multiple process requests, while simultaneously accepting the multiple process requests.

A first process request to the electronic controller is accepted, and a first process in accordance with the accepted first process request starts. After that, before completing the first process, that is, after accepting a second process request to the electronic controller while the first process is executed, the start of a second process in accordance with the accepted second process request is not waited. The accepted first process request and the second process request are arbitrated. The first process in accordance with the accepted first process request and the second process in accordance with the second process request are parallelized. Thereby, it may be possible to execute the multiple processes in accordance with the multiple accepted process requests when simultaneously accepting the multiple process requests of the independent application.

A computer-readable non-transitory storage medium storing a parallel process program may correspond to a parallel process program product.

The invention claimed is:

1. A parallel process apparatus connecting, via at least one bus, a first electronic controller supporting a first reprograming application, a second electronic controller supporting a second reprograming application, and a data communication module storing reprograming data of the first electronic controller and reprograming data of the second electronic controller, the parallel process apparatus comprising:
   a computer; and
   a memory coupled to the computer and storing program instructions that when executed by the computer cause the computer to at least:

transmit a first data signal to the first electronic controller and transmit a second data signal to the second electronic controller, the first data signal including the reprograming data of the first electronic controller, the second data signal including the reprograming data of the second electronic controller;

before receiving a first reprograming response signal from the first electronic controller and before receiving a second reprograming response signal from the second electronic controller, transmit, to the data communication module, a reprograming data request signal of one of the first electronic controller or the second electronic controller;

receive the first reprograming response signal from the first electronic controller and the second reprograming response signal from the second electronic controller;

after receiving the first reprograming response signal from the first electronic controller and the second reprograming response signal from the second electronic controller, and before transmitting a next first data signal to the first electronic controller and before transmitting a next second data signal to the second electronic controller, receive, from the data communication module, a data signal including requested reprograming data of the one of the first electronic controller or the second electronic controller in response to the reprograming data request signal.

2. A parallel processing method applied to a parallel process apparatus, the parallel process apparatus connecting, via at least one bus, a first electronic controller supporting a first reprograming application, a second electronic controller supporting a second reprograming application, and a data communication module storing reprograming data of the first electronic controller and reprograming data of the second electronic controller, the parallel processing method being implemented by program instructions stored in a memory and to be executed by a computer, the instructions comprising:

transmitting a first data signal to the first electronic controller and a second data signal to the second electronic controller, the first data signal including the reprograming data of the first electronic controller, the second data signal including the reprograming data of the second electronic controller;

before receiving a first reprograming response signal from the first electronic controller and before receiving a second reprograming response signal from the second electronic controller, transmitting, to the data communication module, a reprograming data request signal of one of the first electronic controller or the second electronic controller;

receiving the first reprograming response signal from the first electronic controller and the second reprograming response signal from the second electronic controller;

after receiving the first reprograming response signal from the first electronic controller and the second reprograming response signal from the second electronic controller, and before transmitting a next first data signal destined to the first electronic controller and before transmitting a next second data signal destined to the second electronic controller, receiving, from the data communication module, a data signal including requested reprograming data of the one of the first electronic controller or the second electronic controller in response to the reprograming data request signal.

3. A parallel process system comprising:

a first electronic controller supporting a first reprograming application;

a second electronic controller apparatus supporting a second reprograming application;

a data communication module storing reprograming data of the first electronic controller and reprograming data of the second electronic controller; and a parallel process apparatus connected, via at least one bus, with the first electronic controller, the second electronic controller, and the data communication module, wherein the parallel process apparatus includes
a computer, and
a memory coupled to the computer and storing program instructions that when executed by the computer cause the computer to at least:

transmit a first data signal to the first electronic controller and transmit a second data signal to the second electronic controller, the first data signal including the reprograming data of the first electronic controller, the second data signal including the reprograming data of the second electronic controller;

before receiving a first reprograming response signal from the first electronic controller and before receiving a second reprograming response signal from the second electronic controller, transmit, to the data communication module, a reprograming data request signal of one of the first electronic controller or the second electronic controller;

receive the first reprograming response signal from the first electronic controller and the second reprograming response signal from the second electronic controller;

after receiving the first reprograming response signal from the first electronic controller and the second reprograming response signal from the second electronic controller, and before transmitting a next first data signal destined to the first electronic controller and before transmitting a next second data signal destined to the second electronic controller, receive, from the data communication module, a data signal including requested reprograming data of the one of the first electronic controller or the second electronic controller in response to the reprograming data request signal.

* * * * *